United States Patent
Ophardt et al.

(10) Patent No.: US 10,267,305 B2
(45) Date of Patent: Apr. 23, 2019

(54) PISTON PUMP ARRANGEMENT AUTOMATICALLY DISABLING IN ABSENCE OF INLET LIQUID

(71) Applicant: OP-Hygiene IP GmbH, Niederbipp (CH)

(72) Inventors: Heiner Ophardt, Arisdorf (CH); Andrew Jones, St. Anns (CA); Zhenchun Shi, Hamilton (CA); Valery Ten, Hannon (CA)

(73) Assignee: OP-Hygiene IP GmbH, Niederbipp (CH)

( * ) Notice: Subject to any disclaimer, the term of this patent is extended or adjusted under 35 U.S.C. 154(b) by 0 days.

(21) Appl. No.: 15/906,840

(22) Filed: Feb. 27, 2018

(65) Prior Publication Data

US 2018/0245580 A1 Aug. 30, 2018

(30) Foreign Application Priority Data

Feb. 28, 2017 (CA) ...................................... 2959271

(51) Int. Cl.
| | |
|---|---|
| F04B 13/00 | (2006.01) |
| F04B 49/04 | (2006.01) |
| F04B 23/06 | (2006.01) |
| F04B 23/02 | (2006.01) |
| F04B 13/02 | (2006.01) |
| F04B 49/025 | (2006.01) |
| G01F 11/02 | (2006.01) |
| F04B 53/16 | (2006.01) |
| F04B 17/03 | (2006.01) |

(52) U.S. Cl.
CPC .............. *F04B 49/04* (2013.01); *F04B 13/00* (2013.01); *F04B 13/02* (2013.01); *F04B 23/025* (2013.01); *F04B 23/06* (2013.01); *F04B 49/025* (2013.01); *G01F 11/021* (2013.01); *F04B 17/03* (2013.01); *F04B 53/16* (2013.01)

(58) Field of Classification Search
CPC .......... F04B 49/04; F04B 13/00; F04B 13/02; F04B 23/025; F04B 23/06; F04B 49/025; F04B 17/03; F04B 53/16; G01F 11/021
USPC ............................................. 222/135
See application file for complete search history.

(56) References Cited

U.S. PATENT DOCUMENTS

| | | | | |
|---|---|---|---|---|
| 1,745,229 | A * | 1/1930 | Porte ....................... | G01F 11/04 222/255 |
| 5,165,577 | A | 11/1992 | Ophardt | |
| 5,975,360 | A * | 11/1999 | Ophardt ............... | A47K 5/1205 222/83 |
| 8,071,933 | B2 * | 12/2011 | Ophardt ............... | G01F 11/006 222/181.1 |
| 8,113,388 | B2 * | 2/2012 | Ophardt ............... | G01F 11/025 222/181.3 |
| 2017/0056907 | A1 * | 3/2017 | Ophardt ............. | B05B 11/3087 |

FOREIGN PATENT DOCUMENTS

| | | |
|---|---|---|
| GB | 1395206 | 5/1975 |
| GB | 1481811 | 8/1977 |

* cited by examiner

*Primary Examiner* — Benjamin R Shaw
(74) *Attorney, Agent, or Firm* — Thorpe North and Western

(57) ABSTRACT

A piston pump arrangement that disables operation of the pump in the absence of an inlet liquid and also to a piston pump arrangement useful to discharge liquids from at least two sources and to disable discharge of all of the liquids when supply of liquid from at least one source is empty.

20 Claims, 21 Drawing Sheets

PISTON PUMP ARRANGEMENT AUTOMATICALLY DISABLING IN ABSENCE OF INLET LIQUID

SCOPE OF THE INVENTION

This invention relates to a piston pump arrangement that disables operation of the pump in the absence of an inlet liquid and also to a piston pump arrangement useful to discharge liquids from at least two sources and to disable discharge of all of the liquids when supply of liquid from at least one source is empty.

BACKGROUND OF THE INVENTION

Pump arrangements are known in which a liquid is fed by gravity to the inlet of a pump which is operative to discharge the liquid as out an outlet.

As but one example of the prior art, U.S. Pat. No. 8,071,933 to Ophardt, issued Dec. 6, 2011 illustrates a dispensing system for dispensing liquid, most preferably, hand cleaning fluid from a liquid reservoir. The liquid is gravity fed from a liquid reservoir to a piston pump and discharged via a piston of the piston pump being reciprocally moved in a piston chamber. The piston is moved by an actuator which engages the piston and the actuator being moved by the rotation of a motor connected to the actuator by a centric cam. The reservoir and its attached piston pump assembly are adapted to be removed and replaced when the liquid in the reservoir is exhausted. The present applicant has appreciated the disadvantage with such prior art devices that in a case when the liquid in the reservoir is exhausted, the dispenser is continued to be operated by a user and with time, the resistance to movement of the piston can substantially increase with resulting damage to the motorized activator assembly including the actuator, the motor and coupling mechanisms between the motor and the actuator such as gear arrangements, centric cams and the like. Damage to the actuation system is disadvantageous since the actuation system is to remain in the dispenser for continued use for an extensive time without replacement.

Prior art dispensers are known which simultaneously dispense a first liquid from a first liquid source and a second liquid from a second liquid source. Proper operation of any such prior art devices require the simultaneous dilution of both liquids.

A disadvantage of such known devices is that when the source of one of the two liquids is exhausted, the pump arrangement continues to dispense the other liquid with the disadvantage that the resultant product is not the mixture intended to be discharged.

Prior art devices are known in which two liquids from two sources are to be simultaneously dispensed and at least one of the liquids in its form prior to mixture has a disadvantage associated with it when discharged without the other liquid. For example, one of the liquids may be a concentrated cleaner which, by itself, would be hazardous as in being corrosive and otherwise detrimental when used alone, and the second fluid may be a diluent such as, for example, water which when mixed with the first liquid renders the liquid mixture safe for an intended use. The applicant has appreciated the disadvantage that in a pump arrangement for dispensing both the first concentrate liquid and the second diluent concentrate that if the supply of the diluent liquid becomes empty, the pump arrangement may discharge merely the concentrate liquid presenting a hazardous disadvantage. As well, the applicant has appreciated the disadvantage that should the supply of the concentrate liquid be empty, the disadvantage arises that the pump arrangement will continue to dispense merely the diluent liquid having the disadvantage of the delivering a product which is different than the product intended.

The present inventors have appreciated that known self-dilution pump arrangements that are to discharge two liquids suffer the disadvantage that they do not provide simple and inexpensive mechanisms to ensure that when either one of two liquids is exhausted that dispensing of both liquids is stopped.

In one aspect, the present invention provides a pump arrangement comprising:

a first piston pump having a first chamber and a first piston reciprocally movable along a first axis in the first chamber to draw a first fluid into the first chamber from a first reservoir through a first conduit opening into the first chamber and discharge the first fluid out a first outlet, a first float valve across the first conduit between the first reservoir and the first chamber, the first float valve including a first float movable between an open condition and a closed condition, the first float buoyant in the first fluid, the first float assuming the open condition when a level of the first fluid in the first conduit is above a predetermined first fluid float level, the first float assuming the closed position when a level of the first fluid in the first conduit is at or below the predetermined first float level, with the first float in the open condition, the first float valve permitting for flow in the first conduit from the first reservoir to the first chamber, with the first float in the closed condition, the first float valve preventing flow in the first conduit from the first reservoir to the first chamber, with the first float in the closed position, reciprocal movement of the first piston creates a vacuum condition in first chamber between the first float valve and the first piston, a driving member movable reciprocally parallel to the first axis, the driving member adapted to be coupled to an actuator which moves the driving member reciprocally parallel to the first axis, a releasable juncture arrangement releasably coupling the driving member and the first piston together, the releasable friction juncture arrangement having a coupled condition and an uncoupled condition, in the coupled condition, the releasable juncture arrangement couples the driving member and the first piston together such that reciprocal movement of the driving member parallel the first axis moves the first piston member parallel the first axis in unison, in the uncoupled condition, the releasable juncture arrangement does not couple the driving member and the first piston together such that reciprocal movement of the driving member parallel the first axis does not move the piston member rendering the first piston pump inoperative to discharge the first fluid by movement of the driving member, with the releasable juncture arrangement in the coupled position, when the vacuum condition in the first chamber is greater than a threshold separation vacuum, the releasable juncture arrangement assumes the uncoupled position.

Preferably, the pump arrangement of the first aspect includes a second piston pump having a second chamber and a second piston reciprocally movable along a second axis in the second chamber to draw a second fluid into the second chamber from a second reservoir through a second conduit opening into the second chamber and discharge the second fluid out a second outlet, the second axis parallel to the first axis, a second float valve across the second conduit between the second reservoir and the second chamber, the second float valve including a second float movable between an open condition and a closed condition, the second float buoyant in the second fluid, the second float assuming the open condition when a level of the second fluid in the second conduit is above a predetermined second fluid float level, the second float assuming the closed position when a level of the second fluid in the second conduit is at or below the predetermined second float level, with the second float in the open condition, the second float valve permitting for flow in the second conduit from the second reservoir to the second chamber, with the second float in the closed condition, the second float valve preventing flow in the second conduit from the second reservoir to the first chamber, with the second float valve in the closed position, reciprocal movement of the second piston creates a vacuum condition in second chamber between the second float valve and the second piston, a coupling bridge member mechanically linking the first piston and the second piston together to form a driven member carrying the first piston and second piston mechanically linked with the bridge member for movement in unison parallel the first axis, the driving member coupled to the driven member by the releasable juncture arrangement, in the coupled position of the releasable juncture arrangement, the releasable friction juncture arrangement securing the driving member and the driven member together for reciprocal movement along the axis in unison, in the uncoupled position of the releasable juncture arrangement, the movement of the driving member does not move the driven member rendering both the first piston pump inoperative to discharge the first fluid by movement of the driving member and the second piston pump inoperative to discharge the second fluid by movement of the driving member, with the releasable juncture arrangement in the coupled position, when either the first vacuum condition is greater than the threshold separation vacuum or the second vacuum condition is greater than the threshold separation vacuum, the releasable juncture arrangement assumes the uncoupled position.

In a $2^{nd}$ aspect, the present invention provides a pump arrangement comprising:

a first piston pump having a first chamber and a first piston reciprocally movable along a first axis in the first chamber to draw a first fluid into the first chamber from a first reservoir through a first conduit opening into the first chamber and discharge the first fluid out a first outlet, wherein reciprocal movement of the first piston discharges the first fluid from the first reservoir until the first reservoir is empty of the first fluid wherein further reciprocal movement of the first piston creates a vacuum condition in first chamber axially inward of the first piston, a driving member movable reciprocally parallel to the first axis, the driving member adapted to be coupled to an actuator which moves the driving member reciprocally parallel to the first axis, a releasable juncture arrangement releasably coupling the driving member and the first piston together, the releasable friction juncture arrangement having a coupled condition and an uncoupled condition, in the coupled condition, the releasable juncture arrangement couples the driving member and the first piston together such that reciprocal movement of the driving member parallel the first axis moves the first piston member parallel the first axis in unison, in the uncoupled condition, the releasable juncture arrangement does not couple the driving member and the first piston together such that reciprocal movement of the driving member parallel the first axis does not move the piston member rendering the first piston pump inoperative to discharge the first fluid by movement of the driving member, with the releasable juncture arrangement in the coupled position, when the vacuum condition in the first chamber is greater than a threshold separation vacuum, the releasable juncture arrangement assumes the uncoupled position.

In a $3^{rd}$ aspect, the present invention provides a pump arrangement comprising:

a first piston pump having a first dispensing chamber and a first piston element reciprocally movable along a first axis in the first dispensing chamber to draw a first fluid into the first dispensing chamber from a first reservoir through a first conduit opening into the first dispensing chamber and discharge the first fluid out a first discharge outlet, the first piston pump including a first inlet one-way valve across the first conduit, the first inlet one-way valve providing for flow of the first fluid from the first reservoir to the first dispensing chamber but preventing flow of the first fluid from the first dispensing chamber to the first reservoir, wherein reciprocal movement of the first piston element discharges the first fluid from the first reservoir until the first reservoir is empty of the first fluid wherein further reciprocal movement of the first piston element creates a first vacuum condition in first dispensing chamber axially inward of the first piston element, first piston element including a driven member, a driving member movable reciprocally parallel to the first axis, a releasable juncture arrangement releasably coupling the driving member and the driven member together, the releasable juncture arrangement having a coupled condition and an uncoupled condition, in the coupled condition, the releasable juncture arrangement couples the driving member and the driven member together such that reciprocal movement of the driving member parallel the first axis moves the first piston element parallel the first axis in unison, in the uncoupled condition, the releasable juncture arrangement does not couple the driving member and the driven member together such that reciprocal movement of the driving member parallel the first axis does not move the piston element rendering the first piston pump inoperative to discharge the first fluid by movement of the driving member, with the releasable juncture arrangement in the coupled position, when the first vacuum condition in the first dispensing chamber is greater than a threshold separation vacuum, the releasable juncture arrangement assumes the uncoupled position.

In a $4^{th}$ aspect, the present invention provides the pump arrangement of the $3^{rd}$ aspect, wherein the driving member is adapted to be removably coupled to an actuator member which moves the driving member reciprocally parallel to the first axis, a first float valve across the first conduit between the first reservoir and the first dispensing chamber, the first float valve including a first float movable between an open condition and a closed condition, the first float buoyant in the first fluid, the first float assuming the open condition when a level of the first fluid in the first conduit is above a predetermined first fluid float level, the first float assuming the closed position when a level of the first fluid in the first conduit is at or below the predetermined first float level, with the first float in the open condition, the first float valve permitting for flow in the first conduit from the first reservoir to the first dispensing chamber, with the first float in the closed condition, the first float valve preventing flow in the first conduit from the first reservoir to the first dispensing chamber, with the first float in the closed position, reciprocal movement of the first piston element creates the first vacuum condition in first dispensing chamber between the first float valve and the first piston element.

In a 5$^{th}$ aspect, the present invention provides the pump arrangement of the 4$^{th}$ aspect, the first float valve is across the first conduit between the first reservoir and the first inlet one-way valve.

In a 6$^{th}$ aspect, the present invention provides the pump arrangement of any one of the 3$^{rd}$ to 5$^{th}$ aspects, and wherein the first reservoir is unvented and collapsible.

In a 7$^{th}$ aspect, the present invention provides the pump arrangement of any one of the 3$^{rd}$ to 5$^{th}$ aspects wherein the first reservoir is vented to the atmosphere.

In an 8$^{th}$ aspect, the present invention provides the pump arrangement of any one of the 3$^{rd}$ to 7$^{th}$ aspects including:

a second piston pump having a second dispensing chamber and a second piston element reciprocally movable along a second axis in the second dispensing chamber to draw a second fluid into the second dispensing chamber from a second reservoir through a second conduit opening into the second dispensing chamber and discharge the second fluid out an outlet selected from the first discharge outlet and a second outlet, the second axis parallel to the first axis, the second piston pump including a second inlet one-way valve across the second conduit, the second inlet one-way valve providing for flow of the second fluid from the second reservoir to the second dispensing chamber but preventing flow of the second fluid from the second dispensing chamber to the second reservoir, wherein reciprocal movement of the second piston element discharges the second fluid from the second reservoir until the second reservoir is empty of the second fluid wherein further reciprocal movement of the second piston element creates a second vacuum condition in second dispensing chamber axially inward of the second piston element, a coupling bridge member mechanically linking the first piston element and the second piston element together for movement in unison parallel the first axis and forming the driven member, in the uncoupled position of the releasable juncture arrangement, the movement of the driving member does not move the driven member rendering both the first piston pump inoperative to discharge the first fluid by movement of the driving member and the second piston pump inoperative to discharge the second fluid by movement of the driving member, with the releasable juncture arrangement in the coupled position, when either the first vacuum condition is greater than the threshold separation vacuum or the second vacuum condition is greater than the threshold separation vacuum, the releasable juncture arrangement assumes the uncoupled position.

In a 9$^{th}$ aspect, the present invention provides the pump arrangement of the 8$^{th}$ aspect including:

a second float valve across the second conduit between the second reservoir and the second chamber, the second float valve including a second float movable between an open condition and a closed condition, the second float buoyant in the second fluid, the second float assuming the open condition when a level of the second fluid in the second conduit is above a predetermined second fluid float level, the second float assuming the closed position when a level of the second fluid in the second conduit is at or below the predetermined second float level, with the second float in the open condition, the second float valve permitting for flow in the second conduit from the second reservoir to the second dispensing chamber, with the second float in the closed condition, the second float valve preventing flow in the second conduit from the second reservoir to the second dispensing, with the second float valve in the closed position, reciprocal movement of the second piston element creates the vacuum condition in second dispensing chamber between the second float valve and the second piston element.

In a 10$^{th}$ aspect, the present invention provides the pump arrangement of the 9$^{th}$ aspect wherein:

the second float valve is across the second conduit between the second reservoir and the second inlet one-way valve.

In an 11$^{th}$ aspect, the present invention provides the pump arrangement of the 8$^{th}$, 9$^{th}$ or 10th aspect wherein the second reservoir is unvented and collapsible.

In a 12$^{th}$ aspect, the present invention provides the pump arrangement of the 8$^{th}$, 9$^{th}$ or 10$^{th}$ aspect wherein the first reservoir is vented to the atmosphere and the second reservoir is vented to the atmosphere.

In a 13$^{th}$ aspect, the present invention provides the pump arrangement of any one of the 3$^{rd}$ to 12$^{th}$ aspects wherein the driving member and the driven member are mechanically engaged through a frangible member that severs when the applied tension force parallel the first axis is greater than a threshold tension force parallel the first axis.

In a 14$^{th}$ aspect, the present invention provides the pump arrangement of any one of the 3$^{rd}$ to 12$^{th}$ aspects wherein the driving member and the driven member are frictionally engaged with frictional forces preventing disengagement unless the applied tension force parallel the first axis is greater than a threshold tension force parallel the first axis.

In a 15$^{th}$ aspect, the present invention provides the pump arrangement of any one of the 3$^{rd}$ to 14$^{th}$ aspects wherein the releasable juncture arrangement is formed by the driving member and the driven member being engaged to prevent relative axial movement of the driving member relative the driven member by the application across the releasable juncture arrangement of an applied tension force parallel the first axis unless the applied tension force parallel the first axis is greater than a threshold tension force parallel the first axis.

In a 16$^{th}$ aspect, the present invention provides the pump arrangement of any one of the 8$^{th}$ to 15$^{th}$ aspects wherein:

the first float valve including a first valve seat about a first fluid outlet opening, in the closed condition, a surface of the first float sealably engages the first valve seat to prevent flow through the first fluid outlet opening to the first dispensing chamber, and the first float valve including a first cage structure constraining movement of the first float with the first cage structure, the first float movable in the first cage structure between the open condition and the closed condition, the second float valve including a second valve seat about a second fluid outlet opening, in the closed condition, a surface of the second float sealably engages the second valve seat to prevent flow through the second fluid outlet opening to the second dispensing chamber, and the second float valve including a second cage structure constraining movement of the second float with the second cage structure, the second float movable in the second cage structure between the open condition and the closed condition.

In a 17$^{th}$ aspect, the present invention provides the pump arrangement of any one of the 3$^{rd}$ to 16$^{th}$ aspects wherein the first dispensing chamber having an open outer end, the first piston element having a distal inner end coaxially slidable within the first dispensing chamber about the first axis, the first piston element extending from the distal inner end outwardly through the open outer end of the first dispensing chamber to an outer end of the first piston element carrying the first discharge outlet, a central passageway through the first piston element from the driven member to the driving member open to the first discharge outlet carried on the driving member.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
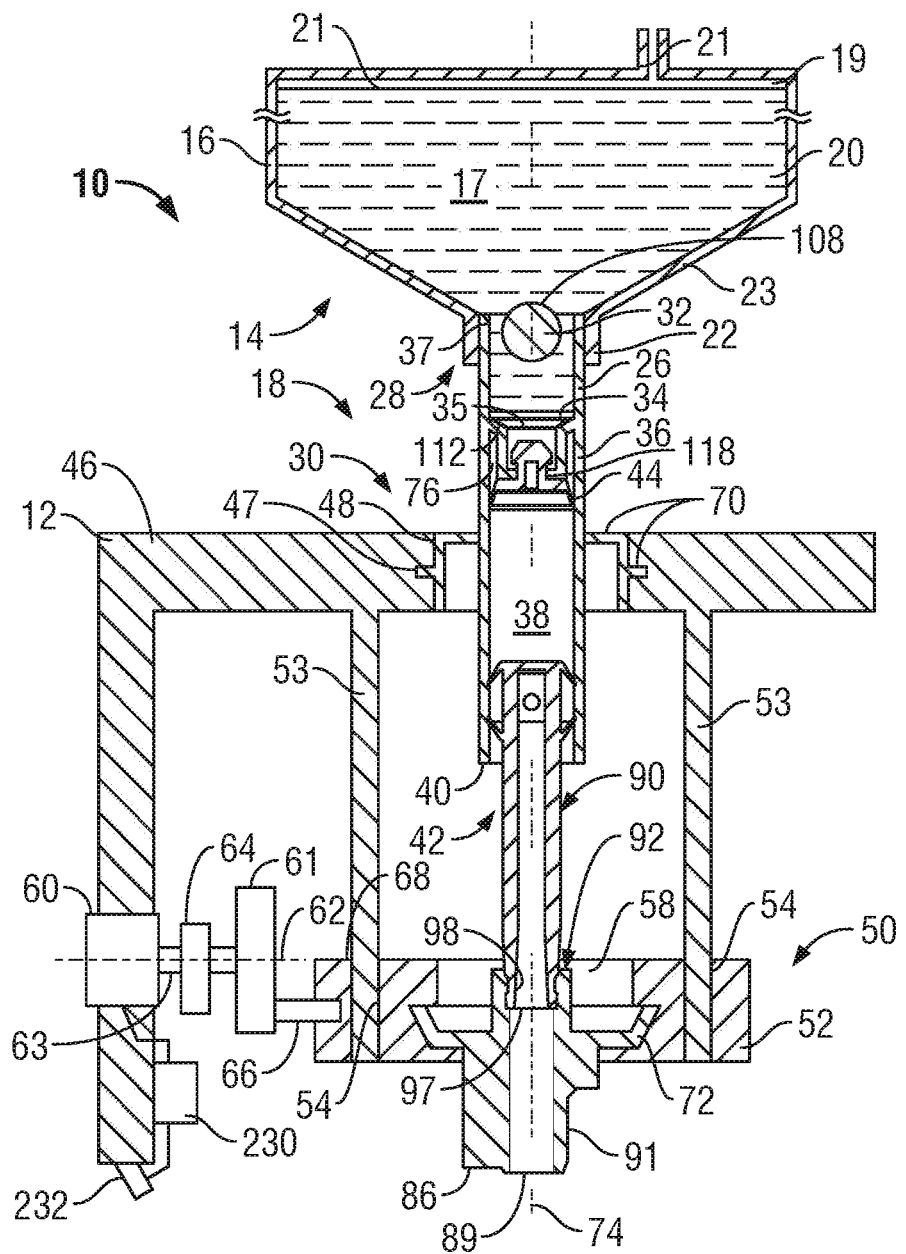
FIG. 1 is a schematic cross-sectional front view of a dispenser in accordance with the first embodiment of the present invention with a reservoir filled with a liquid and a piston of a piston pump in an extended position.

Reference is made first to FIG. 1 which schematically shows a vertical cross-sectional front view of a dispenser 10 in accordance with a preferred embodiment of the invention. The dispenser 10 comprises a housing 12 and a replaceable cartridge 14. The cartridge 14 comprises a reservoir 16 containing a fluid 17 and a pump arrangement 18. FIG. 1 schematically shows the housing 12 supporting the cartridge 14 ready to dispense the fluid 17 from the reservoir 16.

The reservoir 16 comprises a reservoir chamber 20 for holding the fluid 17 as, for example, liquid soap, which is to be dispensed. The reservoir chamber is open to the atmosphere by a vent opening 21. A reservoir outlet 22 is provided through a lowermost wall 23 of the chamber 20 open into an inlet conduit 26 to the pump arrangement 18. In downstream succession, the pump arrangement 18 provides a float valve 28 and a piston pump 30.

Figure 2:
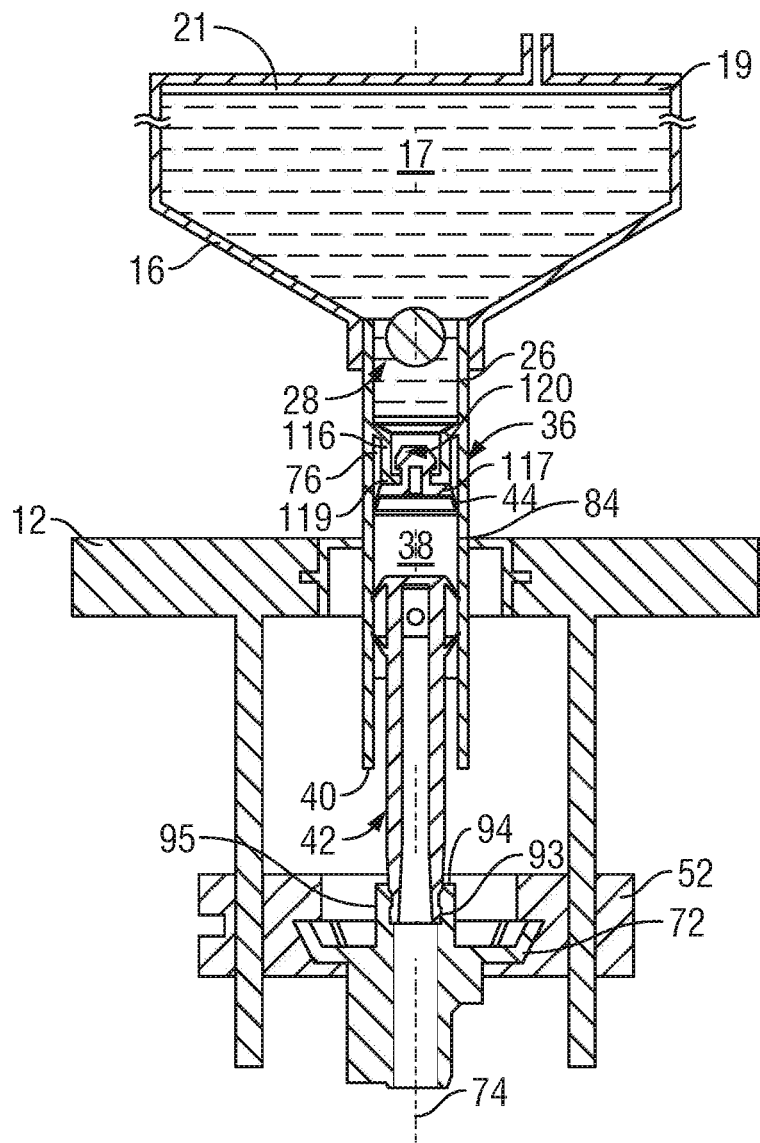
FIG. 2 is a view the same as FIG. 1 but with the piston in a retracted position.
Figure 3:
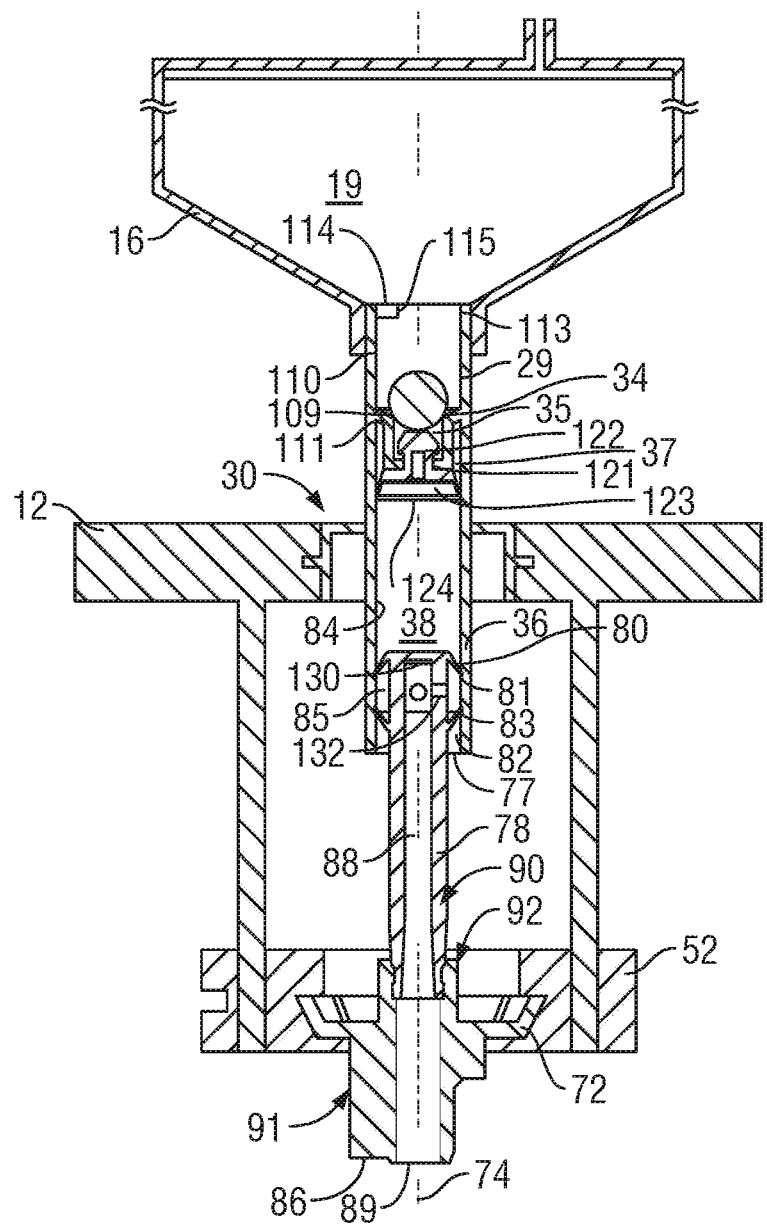
FIG. 3 is a view of the dispenser as in FIG. 1 but with the reservoir empty of the liquid.
Figure 4:
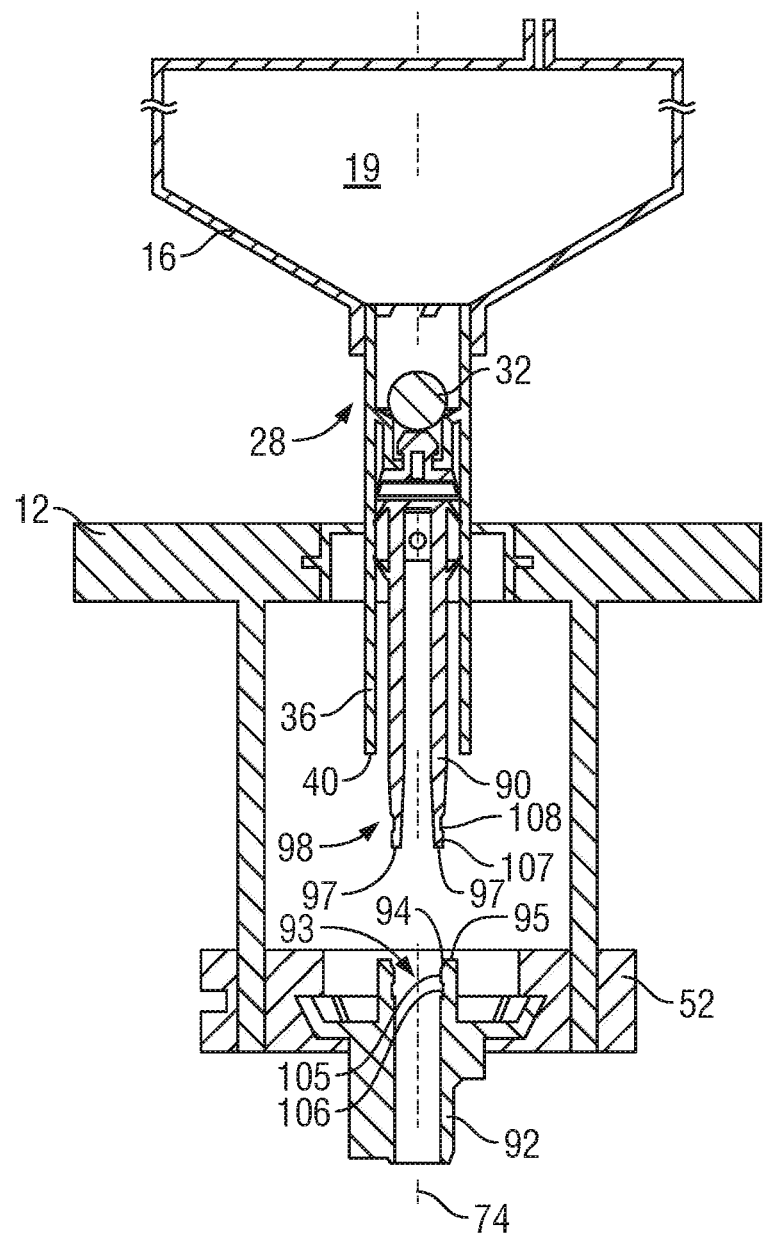
FIG. 4 is a view the same as FIG. 3 but showing the piston uncoupled from a driving member.
Figure 5:
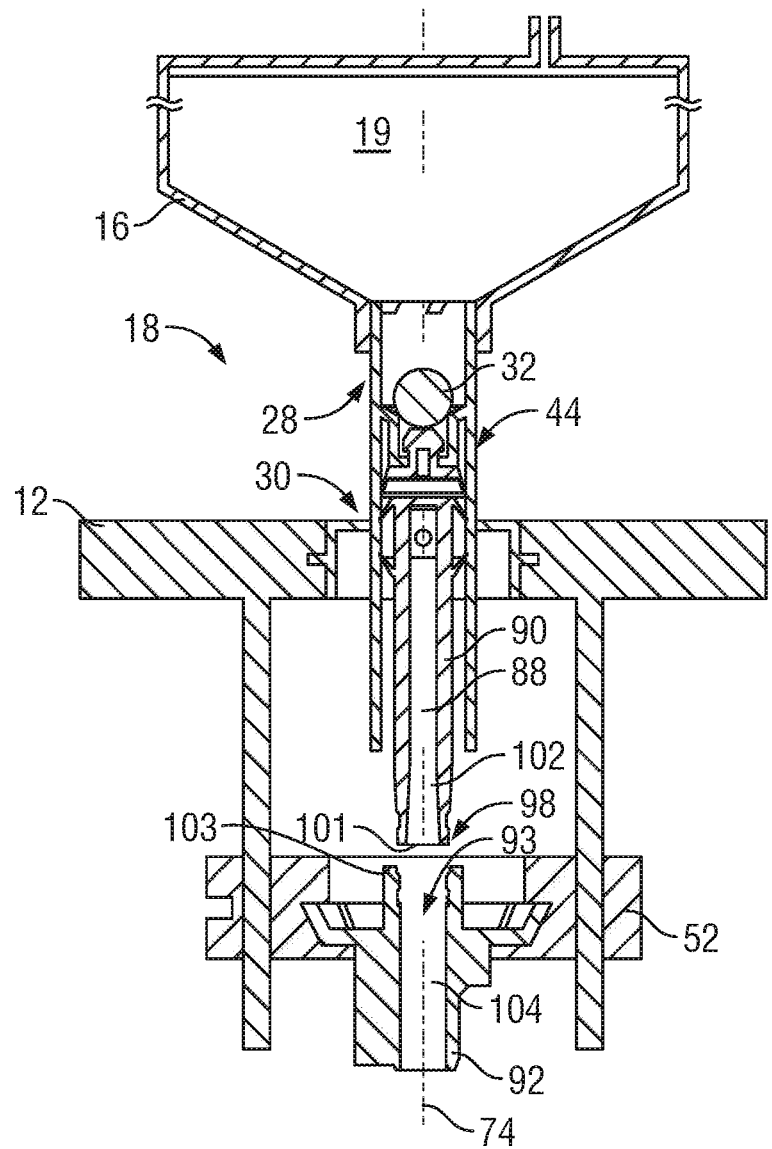
FIG. 5 is a view the same as FIG. 4 but showing the driving member in the retracted position.

The float valve 28 includes a float 32 buoyant in the fluid 17 and constrained for movement between an open position shown in FIGS. 1 and 2 permitting fluid flow outwardly through the float valve 32 and a closed position shown in FIGS. 3 to 5 in which, in an absence of the fluid 17 with atmospheric air 19 in the inlet conduit 26, the float 32 sealably engages an annular valve seat 34 coaxially about a float valve outlet opening 35 to prevent flow outwardly through the float valve outlet opening 35 of the float valve 32 to an inlet 37 to the piston pump 30.

A chamber-forming member 36 of the pump arrangement 18 is fixed at an inner end 37 to the reservoir 16. The chamber-forming member 36 carries the inlet conduit 26 and the float valve 28 proximate its inner end 37 and a dispensing chamber 38 of the piston pump 30 proximate an open outer end 40. The piston pump 30 includes an inlet one-way valve 44 downstream from the float valve 28 between the float valve 28 and the dispensing chamber 38. The one-way valve 44 permits flow outwardly from the float valve 28 through the float valve outlet opening 35 into an inner end 76 of the dispensing chamber 38 and prevents flow inwardly from the dispensing chamber 38. The pump arrangement 18 also includes a piston element 42 received in dispensing chamber 38 and coaxially reciprocally movably relative to the chamber-forming member 36 in the dispensing chamber 38 about a central axis 74.

Actuator

The housing 12 includes a horizontal support flange 46. The support flange 46 has a support opening 48 vertically therethrough closed at a blind rear end and open forwardly to the front of the support flange 46. A support slotway 47 extends horizontally from the support opening 48 on each side from the support opening 48.

An actuator assembly 50 is provided on the housing 12 movable vertically relative to the support flange 46 of the housing 12. The actuator assembly 50 includes an actuator plate 52 mounted to the housing 12 to be vertically slidable relative the housing 12 guided on a pair of vertically extending guide rods 53 extending downwardly from the support plate 46 and through a pair of cylindrical guide bores 54 through the actuator plate 52. The actuator plate 52 has a catch opening 58 vertically therethrough open forwardly to the front of the actuator plate 52.

An electric motor 60 is schematically shown as mounted to the housing 12 to rotate a drive wheel 61 about a horizontal axis 62. Motion is transferred from the motor 60 to the drive wheel 61 through a shaft 63 and a gear box 64. The drive wheel 61 carries an eccentrically mounted axially extending cam post 66 received in a front to rear horizontally extending channel 68 in the actuator plate 52 such that rotation of the drive wheel 61 moves the actuator plate 52 vertically on the guide rods 53 relative the housing 12 between an extended position shown in FIG. 1 and a retracted position shown in FIG. 2.

The support opening 48 of the support flange 46 and the catch opening 58 on the actuator plate 52 are positioned to permit the cartridge 14 to be slid horizontally, rearward for coupling and forwardly for uncoupling, relative the housing 12 with the chamber-forming member 36 and a supporting flange 70 on the chamber-forming member 36 removably received in the support opening 48 and its support slotway 47 of the support flange 46, and an engagement member 72 on the piston element 42 removably received in the catch opening 58 of the actuator plate 52.

With the chamber-forming member 36 received in the support opening 48 with the supporting flange 70 of the chamber-forming member 36 received in the support slotway 47, the support flange 46 supports the chamber-forming member 36 and thereby the reservoir 16 fixed to the housing 12 against relative vertical movement. With the engagement member 72 of the piston element 42 received in the catch opening 58 of the actuator plate 52, the piston element 42 is reciprocally movable with the actuator plate 52 relative the chamber-forming member 36. With the engagement member 72 of the piston element 42 engaged with the actuator plate 32, reciprocal movement of the actuator plate 32 between the extended position and the retracted position results in corresponding coaxial reciprocal movement of the piston element 42 relative the chamber-forming member 36 which, when the reservoir 12 contains the fluid 17, dispenses the fluid 17 from the reservoir 12 out a discharge outlet 89 at an outer end 86 of the piston element 42.

A control mechanism 230 is provided to operate the dispenser 10. The control mechanism 230 preferably includes a sensor 232 on the housing 12 to sense the presence of a user's hand below the discharge outlet 89 and to suitably operate the motor 60 when a user's hand is sensed by the sensor 232 as being below the discharge outlet 89.

Float Valve

The float 32 of the float valve 28 is spherical with a spherical outer surface 108.

The chamber-forming member 36 defines the inlet conduit 26 within an axially elongate radially inwardly directed cage wall 110. At an axially outer end 109 of the cage wall 110, a radially inwardly extending annular seat flange 111 extends radially inwardly to the float valve outlet opening 35 with the annular valve seat 34 provided as an axially inwardly directed surface 112 of the annular seat flange 111 coaxially about the float valve outlet opening 35 and complementary to the spherical outer surface 110 of the float 32 such that when the inlet conduit 26 is empty of the fluid 17 and contains air 19 from the atmosphere and the inlet conduit 26 is orientated with the axis 74 vertical as shown in FIGS. 4 and 5 under gravity, the float 32 will sit on the annular seat flange 111 with the spherical outer surface 110 in sealing engagement with the axially inwardly directed surface 112 to prevent flow axially outwardly there between.

At an axially inner end 113 of the cage wall 110 a number of circumferentially spaced spoke-like float stop members 114 are provided, each of which extends radially inwardly from the cage wall 110 to a distal end 115 located at a distance from the central axis 74 less than the diameter of the float 28. The float stop members 114 prevent the float 32 from moving axially inwardly past the float stop members 114. When the inlet conduit 26 is filled with the fluid 17 and orientated with the central axis 74 vertical, the float 32 will float upward within the cage wall 110 into engagement with the float stop members 114 assuming the open position. A cross-sectional area of the inlet conduit 26 normal the axis 74 defined within the cage wall 110 is greater than a maximum cross-sectional area of the float 32 such that other than when float 32 is seated on the annular valve seat 34 fluid 17 may flow past the float 32 through the float valve 28. With the float 32 buoyant in the fluid 17, the float 32 assumes the open position with engagement of the ends 115 of the float stop members 114 tending to locate the float 32 coaxially within the inlet conduit 26 providing for the passage of the fluid 17 axially past the float 32 between the float 32 and the cage wall 110 and through openings between adjacent of the float stop members 114.

The float valve 28 includes a cage structure 29 that constrains the float 32 for movement between the open position shown in FIG. 1 and the closed position shown in FIGS. 3 to 5. The cage structure 29 is provided by the chamber-forming member 38 and includes the cage wall 110, the annular seat flange 111 and the float stop members 114 arranged to limit movement of the float 32 within the axially extending circumferentially extending cage wall 110 laterally about float 32 and between the axially inwardly directed annular seat flange 111 at the axial outer end 109 of the cage wall 110 and the axially outwardly directed float stop members 114 at the axial inner end 113 of the cage wall 110.

FIGS. 1 to 5 show fluid 17 with an upper surface of the fluid 17 where the fluid interfaces with air 19 from the atmosphere representing a vertical height or level 21 of the fluid. The float 32 will assume the closed condition when the level 21 of the fluid 17 in the inlet conduit 26 is below a predetermined closed fluid float level, and the float 32 will assume the open condition when the level of the fluid 17 in the inlet conduit 26 is at or above a predetermined open fluid float level. The predetermined closed fluid float level and the predetermined open fluid float level may be expected to be the same albeit this is not necessary.

Piston Pump

The piston pump 30 illustrated is of the type described in U.S. Pat. No. 5,165,577 to Ophardt, issued Nov. 24, 1992, the disclosure of which is incorporated herein by reference.

The piston pump 30 includes the one-way valve 44, the chamber-forming member 36 and the piston element 42.

One-Way Valve

The chamber-forming member 36 provides the dispensing chamber 38 with a radially inwardly directed side wall 84 coaxial about the central axis 74 between the inner end 76 and an open outer end 77 of the dispensing chamber 38.

The one-way valve 44 permits fluid 17 from the reservoir 16 to flow outwardly into the dispensing chamber 38 but prevents flow from the dispensing chamber 38 inwardly back towards the reservoir 16.

The radially inwardly extending annular seat flange 111 extends axially outwardly as an inner tubular member 116 extending coaxially axially into the inner end 76 of the dispensing chamber 38 providing the float valve outlet opening 35 centrally therethrough. The inner tubular member 116 ends at a radially end wall 117 with a central hole 118 therethrough and circumferentially spaced openings 119 axially through the end wall 117 radially outwardly of the center hole 118.

The one-way valve 44 includes a valve member 120 with a central stem 121 carrying at an axial inner end an enlarged plug 122 and, at an axial outer end, a flexible circular disc 123. The disc 123 extends radially outwardly to a distal circumferential edge 124. The valve member 120 is secured to the end wall 117 of the inner tubular member 116 with the central stem 121 engaged in the center hole 118 capturing the end wall 117 between the plug 122 and the disc 123. The distal edge 124 of the disc 123 is resilient and biased into engagement with the side wall 84 of the dispensing chamber 38 so as to prevent flow axially outwardly between the disc 123 and the side wall 84. The distal end 124 of the disc 123 is resilient to be deflectable axially outwardly and radially inwardly when a pressure on the axial inner side of the disc 123 is greater than a pressure on the axial outer side of the disc 123 so as to permit flow axially outwardly between the disc 123 and the side wall 84. Flow of fluid 17 when permitted by the one-way valve 44 and the float valve is through the float valve outlet opening 35 into the inner tubular member 116 through the end wall 117 via the openings 119 and axially outwardly between the disc 123 and the side wall 84.

Piston

The reciprocally movable piston element 42 is coaxially slidably received within the dispensing chamber 38 for reciprocal relative sliding about the axis 74. The piston element 42 has an axially extending hollow stem 78. The stem 78 of the piston element 42 extends from the dispensing chamber 38 axially outwardly through the open outer end 77 of the dispensing chamber 38 to the discharge outlet 89 at the outer end 86 of the piston element 42.

The side wall 84 of the dispensing chamber 38 is circular in cross-section about the axis 74 and preferably cylindrical.

Three discs are provided on the stem 78 extending radially outwardly from the stem 78 at axially spaced locations. A first inner disc 80 is provided at an innermost end of the stem 78 spaced axially inwardly from a second outer disc 82 which, in turn, is spaced axially inwardly from a third disc providing the engagement member 72. Both the inner disc 80 and the outer disc 82 are coaxially slidable within the dispensing chamber 38.

The inner disc 80 extends radially outwardly from the stem 78 to a resilient outer peripheral edge 81 which is directed axially outwardly and is adapted to engage the side wall 84 of the dispensing chamber 38 to prevent flow axially inwardly yet to deflect to permit flow axially outwardly therepast between the outer peripheral edge 81 and the side wall 84.

The outer disc 82 is adapted to be axially slidable within the dispensing chamber 38. The outer disc 82 extends radially outwardly from the stem 78 to an outer peripheral edge 83 that sealably engages the side wall 84 of the dispensing chamber 38 to prevent flow therepast at least axially outwardly but preferably both axially inwardly and outwardly.

An annular compartment 85 is defined between the piston element 42 and the dispensing chamber 38 axially between the inner disc 80 and the outer disc 82 and radially between the stem 78 and the wall 84 of the dispensing chamber 38.

An outermost portion of the stem 78 is hollow with a central passageway 88 extending axially inwardly from the discharge outlet 89 at the outer end 86 of the stem 78 centrally through the stem to a closed inner end 129. A radially extending transfer port 131 extends radially through the stem 78 on the stem 78 in between the inner disc 80 and the outer disc 82 into the central passageway 88 providing communication between the annular compartment 85 and the central passageway 88.

In a withdrawal stroke, with movement from the retracted position of FIG. 2 to the extended position of FIG. 1, the volume between the one-way valve 44 and the inner disc 80 increases creating a relative vacuum between the one-way valve 44 and the inner disc 80 that opens the one-way valve 44. While the float 32 is in the open condition, this relative vacuum draws fluid 17 from the reservoir 16 through the float valve 30 past the one-way valve 44 and into the dispensing chamber 38 between the one-way valve 44 and the inner disc 80.

In a retraction stroke, with movement from the extended position of FIG. 1 to the retracted position of FIG. 2, the volume between the one-way valve 44 and the inner disc 80 decreases as does the volume between the one-way valve 44 and the outer disc 82. This decrease in volume increases the pressure between the one-way valve 44 and the inner disc 80 closing the one-way valve 44 and forcing fluid located between the one-way valve 44 and the inner disc 80 outwardly past the inner disc 80 into the annular compartment 85 between the inner disc 80 and the outer disc 82 and, hence, through the transfer port 131 into the central passageway 88 and through the central passageway 88 to out the discharge outlet 89.

With the float 32 in the open condition, reciprocal movement of the piston element 42 in a cycle of operation between the retracted position and extended position will successively draw and discharge the fluid 17 from the reservoir 16 and dispense the fluid 17 from the discharge outlet 89.

Releasable Juncture Arrangement

The piston element 42 is formed by two components, namely, an axially inner piston or driven member 90 and an axially outer driving member 91. The driven member 90 and the axially outer driving member 91 are releasably coupled together by a releasable juncture arrangement 92. The driving member 91 has at an inner end 95 an annular socket 93 coaxial about the axis 74 that opens inwardly at an open inner end 94 of the socket 93. The driven member 90 has at an outer end 97 an annular plug 98. The plug 98 and socket 93 are complementarily sized such that the plug 98 is removably received coaxially in the socket 93 in a friction fit.

The releasable juncture arrangement 92 has a coupled condition as shown in FIGS. 1 to 3 in which the plug 98 is removably received coaxially in the socket 93 in a friction fit, and an uncoupled condition as shown in FIGS. 4 and 5 in which the plug 98 is removed from the socket 93.

In the coupled condition as shown in FIGS. 1 to 3, the plug 98 and socket 93 are engaged so as to form a fluid impermeable seal 100 between an outer end 101 of an inner portion 102 of the passageway 88 within the driven member 90 and an inner end 103 of an outer portion 104, the passageway 88 within the driving member 91. The socket 93 has a radially inwardly directed socket wall surface 105 that carries a radially inwardly extending annular 106 with an axially outwardly directed catch surface. The plug 98 has a radially outwardly directed plug wall surface 107 complementary to the socket wall surface 105 and including a radially inwardly extending annular channelway 108 with an axially inwardly directed catch surface. In the coupled condition, the annular boss 106 is received in the annular channelway 108 with the axially outwardly directed catch surface in engagement with and opposed to the axially inwardly directed catch surface.

In the coupled condition shown in FIGS. 1 to 3, the releasable juncture arrangement 92 couples the driven member 90 and the driving member 91 together such that reciprocal movement of the driving member 91 parallel the axis 74 moves the driven member 90 parallel the axis 74 in unison.

In the uncoupled condition of the releasable juncture arrangement 92 as shown in FIGS. 4 and 5, movement of the driving member 91 does not move the driven member 90.

With the releasable juncture arrangement 92 in the coupled position, the frictional engagement of the socket 93 and the plug 98 is such that releasable juncture arrangement 92 remains in the coupled condition unless axially directed forces are applied to the driven member 90 relative to the driving member 91 to draw the driven member 90 axially away from the driving member 91 greater than a threshold force, in which case the frictional engagement of the socket 93 and the plug 98 is overcome, the socket 93 and the plug 98 are axially separated from engagement with each other and the releasable juncture arrangement 92 assumes the uncoupled position with the driven member 90 and the driving member 91 axially separated from engagement with each other such as seen in FIGS. 4 and 5.

As seen, the releasable juncture arrangement 92 is on the piston element 42 axially intermediate the engagement member 72 and the second outer disc 82.

Preferably, the plug 98, driven member 90, the socket 93 and the driving member 91 of the piston element 42 is each formed from plastic as by injection molding. Providing the socket 93 on the driving member 91 and the plug 98 on the driven member 90 to be made from plastic material can be of assistance in providing inherent resiliency between the plug 98 and the socket 93 as will provide for separation under a preferred range of axially applied threshold forces.

Operation

Operation of the dispenser 10 is now described with reference to FIGS. 1 to 5.

As seen in FIGS. 1 and 2, with the float 32 in the open condition with the releasable juncture arrangement 92 in the coupled condition coupling the driven member 90 and the driving member 91 together, reciprocal movement of the driven member 90 and the driving member 91 together relative the dispensing chamber 38 in a cycle of operation draws the fluid from the reservoir 16 and discharges the fluid 17 from the discharge outlet 89. That is, in axial reciprocal movement of the piston element 42 between extended and retracted positions relative the chamber-forming member 36, fluid 17 is drawn from the reservoir 16 and dispensed out the discharge outlet 89. That is, in the conditions as depicted in FIGS. 1 and 2, the pump 30 is operative to draw the fluid 17 from the reservoir 16 through the float valve 28 which is open and to discharge the fluid out the discharge outlet 89.

With continued operation of the pump 30 in the configurations as depicted in FIGS. 1 and 2 and repeated discharge of the liquid 17, the level 21 of fluid 17 in the reservoir will drop until the level of the fluid 17 in the inlet conduit 26 is below the predetermined fluid float level whereupon the float 32 will move to assume the closed condition with the releasable juncture arrangement 92 continuing to couple the driven member 90 and the driving member 91 together in the coupled condition as seen in FIG. 3.

With continued movement of the driving member 91 in the configuration as seen in FIG. 3 with the releasable juncture arrangement 92 coupling the driven member 90 and the driving member 91 together in the coupled condition, with the float valve 28 preventing flow outwardly, a vacuum condition below atmospheric pressure will be created within the dispensing chamber 38 axially inward of the piston element 42. This vacuum is created axially outwardly of the float valve 28 and between the float valve 28 and the inner disc 80 on the driven member 90. The vacuum condition will serve to apply axially inwardly directed forces to the driven member 90 attempting to draw the driven member 90 axially inwardly away from the driving member 91. The vacuum condition created between the float valve 28 and the inner disc 80 on the driven member 90 will come to be sufficient to apply across the releasable juncture arrangement 92 an axially directed applied force greater than the threshold force, so as to overcome the frictional engagement of the plug 98 and the socket 93 separating the plug 98 from the socket 93 as the releasable juncture arrangement 92 comes to assume the uncoupled position such as shown in FIGS. 4 and 5. To state this in another manner, when the vacuum condition in the dispensing chamber becomes greater than a threshold separating vacuum, the releasable juncture arrangement assumes the uncoupled position.

With the dispenser in configurations with the releasable juncture arrangement 92 in the uncoupled position such as shown in FIGS. 4 and 5, reciprocal movement of the driving member 91 does not move the driven member 90 and the pump 30 is thus disabled and does not draw or discharge the fluid 17. The operation of the motor 60 will continue to reciprocally move the driving member 91, however, with the releasable juncture arrangement 92 in the uncoupled position the driven member 91 is not moved.

FIG. 2 shows the driving member 91 in a fully retracted position to which it is moved by the actuator plate 52. As can be seen in FIG. 4, the driven member 90 has been drawn axially inwardly until axial inward movement is stopped by the engagement of the inner disc 80 at the inner end of the driven member 90 with the one-way valve member 120. In FIG. 4, the driven member 90 is axially inward from its position in FIG. 2. In FIG. 4, the driven member 90 is axially inwardly such that the axially outer end 97 of the driven member 90 and the axially inner end 95 of the driving member 91 are spaced axially in the fully retracted position and do not interfere with the cyclical movement of the driving member 91 between the fully retracted position and the withdrawn position. The Figures show that there is a sufficient axial spacing between the inner disc 80 at the inner end of the driven member 90 and the one-way valve member 120 for the driven member 90 to be drawn axially inwardly when uncoupled from the driving member 91 and have the driven member 90 avoid engagement by the driving member 91.

Reference is made to FIGS. 6 to 10 which show a second embodiment of a dispenser 10 in accordance with the present invention. In describing the second embodiment, similar reference numerals are used to the reference numerals used to describe the first embodiment. In the second embodiment, pairs of similar function components are provided with components shown on the left side in the Figures referred to as the "first" and components shown on the right side in the Figures referred to as the "second" with the second having a number increased by 100 over the first.

Figure 6:
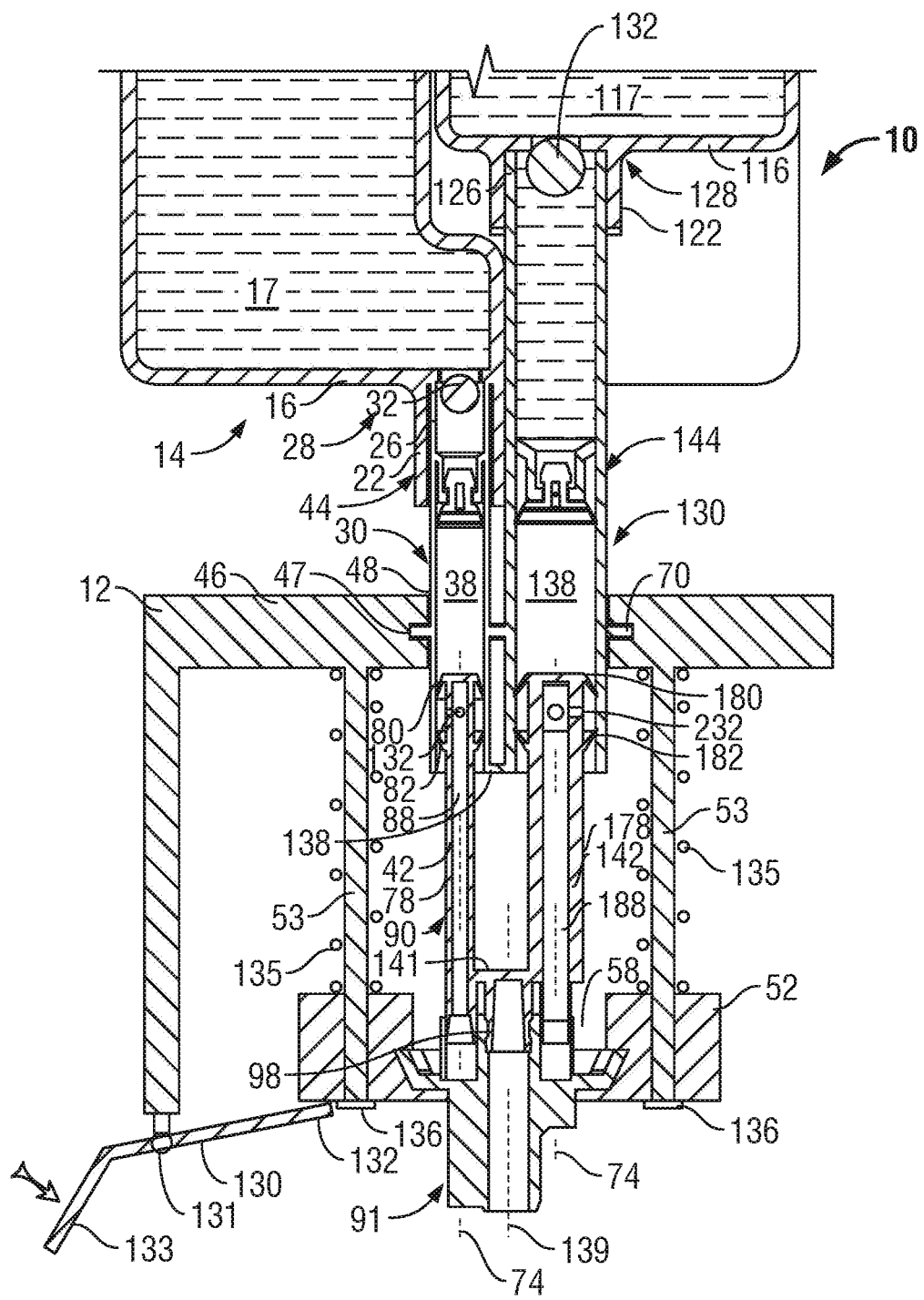
FIG. 6 is a schematic cross-sectional front view of a dispenser in accordance with the second embodiment of the present invention with two reservoirs filled with liquids and a piston of a piston pump in an extended position with a driven member and a driving member of the piston coupled together.

FIG. 6 illustrates the dispenser 10 as having a housing 12 with a horizontal support flange 46 with a support opening 48 and a support slotway 47 identical to that in the first embodiment of FIG. 1. The housing 12 carries an actuator plate 52 with a catch opening 58 vertically slidable on guide rods 53 also identical to that as shown with the first embodiment. FIG. 6 schematically illustrates a manual arrangement for movement of the actuator plate 52 that which includes a lever 130 pivotally mounted to the housing 12 for pivoting about a horizontal axis 131. One end 132 of the lever 30 engages a lower surface of the actuator plate 52 and another end 133 of the lever 130 is presented at a location for engagement by a hand of a user to urge the lever 130 downwardly. A coil spring 135 is provided about each of the guide rods 53 to bias the actuator plate 52 to a fully extended position as stopped by end ferrules 136. Such a manually operated lever 130 and its manner of operation to move an actuator plate is well known and may comprise, for example, an arrangement such as disclosed in U.S. Pat. No. 8,113,388 to Ophardt et al, issued Feb. 14, 2012, the disclosure of which is incorporated herein by reference.

Figure 7:
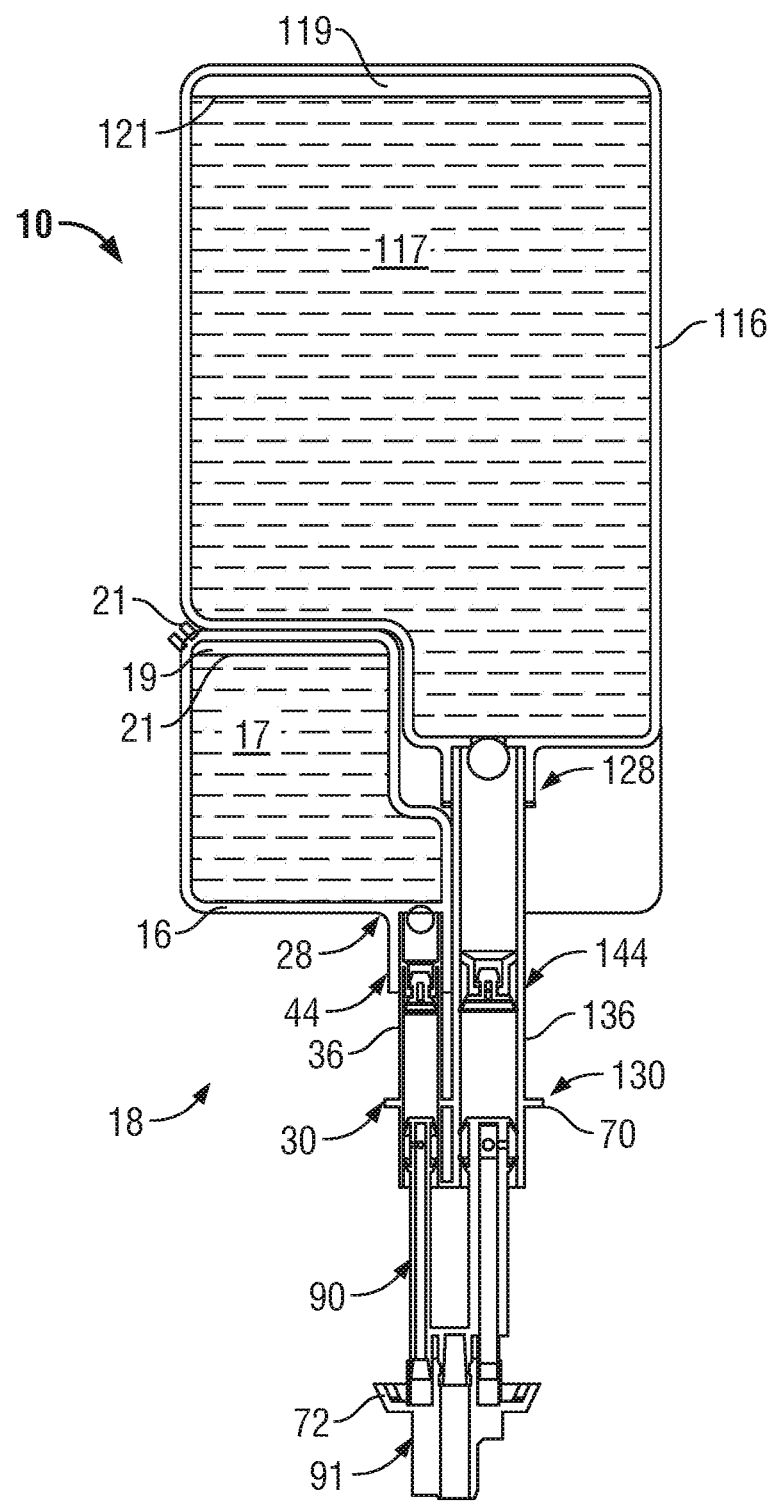
FIG. 7 is a vertical cross-sectional front view of a cartridge as seen in FIG. 6.

In the embodiment as shown in FIGS. 6 to 10, as best seen in FIG. 7, the cartridge 14 has two reservoirs, namely, a first reservoir 16 and a second reservoir 116. The first reservoir 16 contains a first fluid 17 such as a concentrated liquid, for example, a concentrated hand disinfectant. The second reservoir 116 contains a second fluid 117 such as a diluent, for example, water. The first reservoir 16 has a first reservoir outlet 22 connected to a first chamber-forming member 36. The second reservoir 116 has a second reservoir outlet 122 connected to a second chamber-forming member 136. The two chamber-forming members 36, 136 are physically connected together as by a lower connecting flange 137 that merges with the circular supporting flange 70 that extends coaxially outwardly about a central axis 139. The supporting flange 70 is adapted to be received in the support slotway 47. The supporting flange 70 supports both the first and second chamber-forming members 36, 136 and thereby the first and second reservoirs 16, 116 to housing 12 against relative vertical movement.

The first chamber-forming member 36 provides a first inlet conduit 26, a first float valve 28 with a first float 32, a first one-way valve 44 and a first dispensing chamber 38 functioning identical to those described with reference to the first embodiment. The second chamber-forming member 136 provides a second inlet conduit 126, a second float valve 128 to a second float 132, a second one-way valve 144 and a second dispensing chamber 138 functioning identical to those described with reference to the first embodiment.

A first piston element 42 is slidably received within the first dispensing chamber 38 for reciprocal relative sliding about a first axis 74 parallel to the central axis 139 with the first piston element 42 having a first stem 78, a first inner disc 80, a first outer disc 82, a first central passageway 88 and a first transfer port 131 functionally identical to those described with the first embodiment so as to define a first piston pump 30. Similarly, a second piston element 142 is slidably received within the second dispensing chamber 138 for reciprocal relative sliding about a second axis 174 parallel to the first axis 74 with the second piston element 142 having a second stem 178, a second inner disc 180, a second outer disc 182, a second central passageway 188 and a second transfer port 231 functionally identical to those described with the first embodiment so as to define a second piston pump 130.

The first stem 78 and the second stem 178 are fixedly connected together by a bridge member 141 for movement in unison parallel each of the center axis 139 and the first axis 74 and the second axis 174. The bridge member 141 carries an outwardly extending annular plug 98 coaxially about the center axis 139.

An axially outer driving member 91 is provided. The driving member 91 has at an inner end an annular socket 93 coaxial about the center axis 139 that opens axially inwardly at an open inner end 94 of the socket 93. The plug 98 of the bridge member 141 and the socket 93 of the driven member 90 are complementarily sized such that the plug 98 is removably received coaxially in the socket 93 in a friction fit. The driving member 91 has a first fluid socket 143, a second fluid socket 145 and a discharge passage 147. The passage 147 is open at an outer end as a discharge outlet 89. The first fluid socket 143 is connected with the discharge passage 147 by a first fluid outlet port 149 and the second fluid socket 145 is connected to the discharge passage 147 by a second fluid transfer port 151. The first fluid socket 143 opens inwardly at an open inner end 153 which is adapted to receive in a sealable engagement an outer end 155 of the first stem 78. The second fluid socket 145 opens inwardly at an open inner end 157 which is adapted to receive in a sealable engagement an outer end 255 of the second stem 178.

Figure 8:
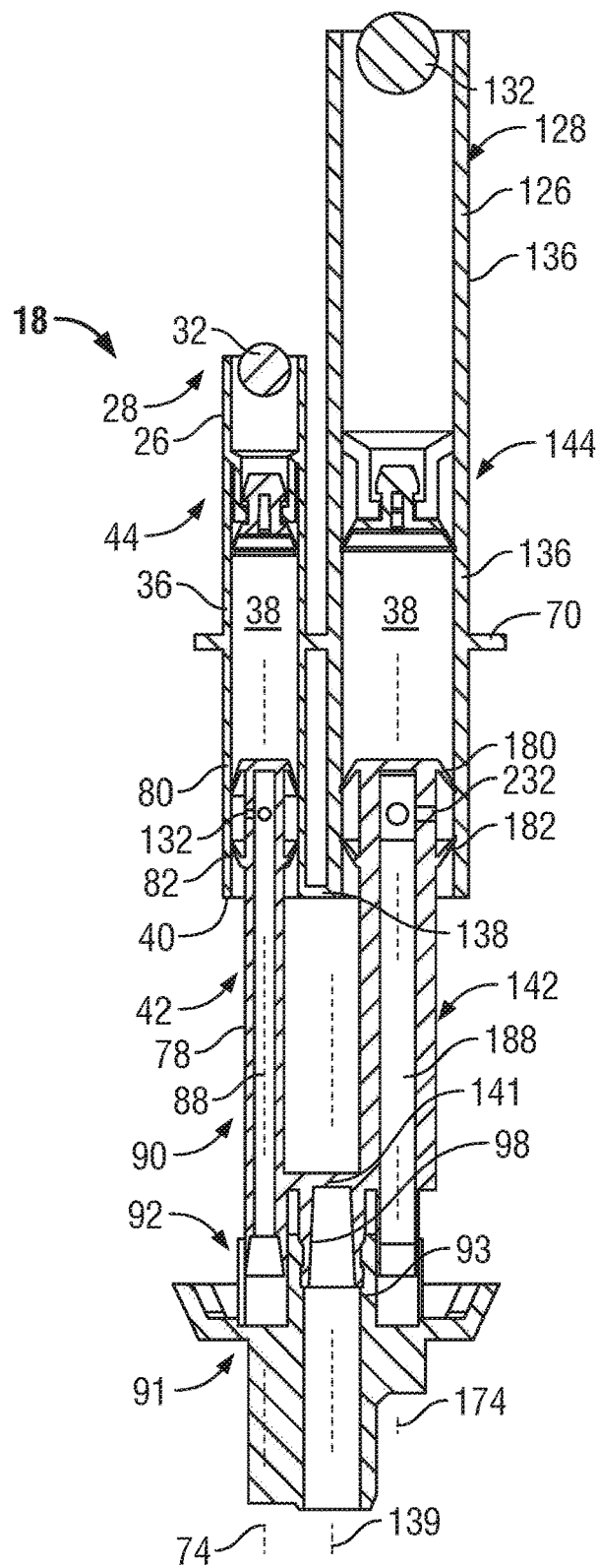
FIG. 8 is a vertical cross-sectional front view of a pump arrangement as seen in FIGS. 6 and 7.

The first piston element 42 and the second piston element 142 are joined together by the bridge member 141 and together form a driven member 90. The driven member 90 and the axially outer driving member 91 are releasably coupled together by a releasable juncture arrangement 92. The releasable juncture arrangement 92 is comprised of the engagement of the coupling socket 93 with the coupling plug 98 as well as the sealable engagement of the first stem 78 in the first fluid socket 143 and the second stem 178 in the second fluid socket 145. In the coupled condition as shown on FIGS. 6, 7 and 8, the releasable juncture arrangement 92 couples the driven member 90 and the driving member 91 together such that reciprocal movement of the driving member 91 parallel the axis 74 moves the driven member 90 parallel the axis 74 in unison to simultaneously operate the first piston pump 30 and the second piston pump 130 to draw and discharge the first fluid 17 from the first socket 143 and the second fluid 117 from the second socket 145 for simultaneous discharge from the discharge outlet 98. Operation of the first pump 30 and the second pump 130 to draw and discharge the first fluid 17 and the second fluid 117 simultaneously occurs when, as shown in FIG. 6, each of the first reservoir 16 and the second reservoir 116 is sufficiently full of liquid such that each of the first float 32 and the second float 132 are in the open condition as seen in FIGS. 6, 7 and 8.

Figure 9:
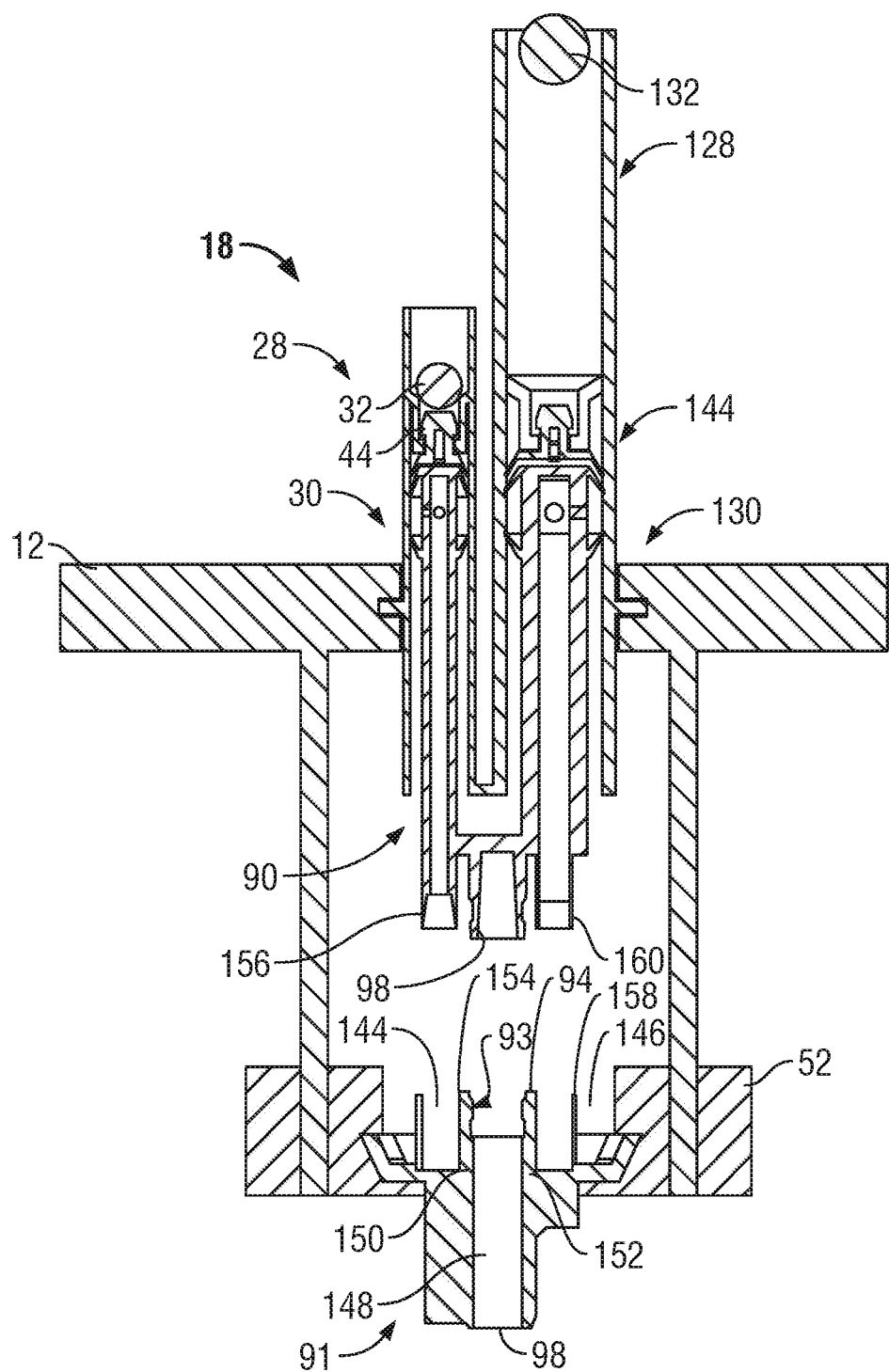
FIG. 9 is a schematic cross-sectional front view of the dispenser of FIG. 6 with a left reservoir empty of liquid and a right reservoir filled with liquid and the piston of a piston pump in an extended position with the driven member and the driving member of the piston uncoupled.
Figure 10:
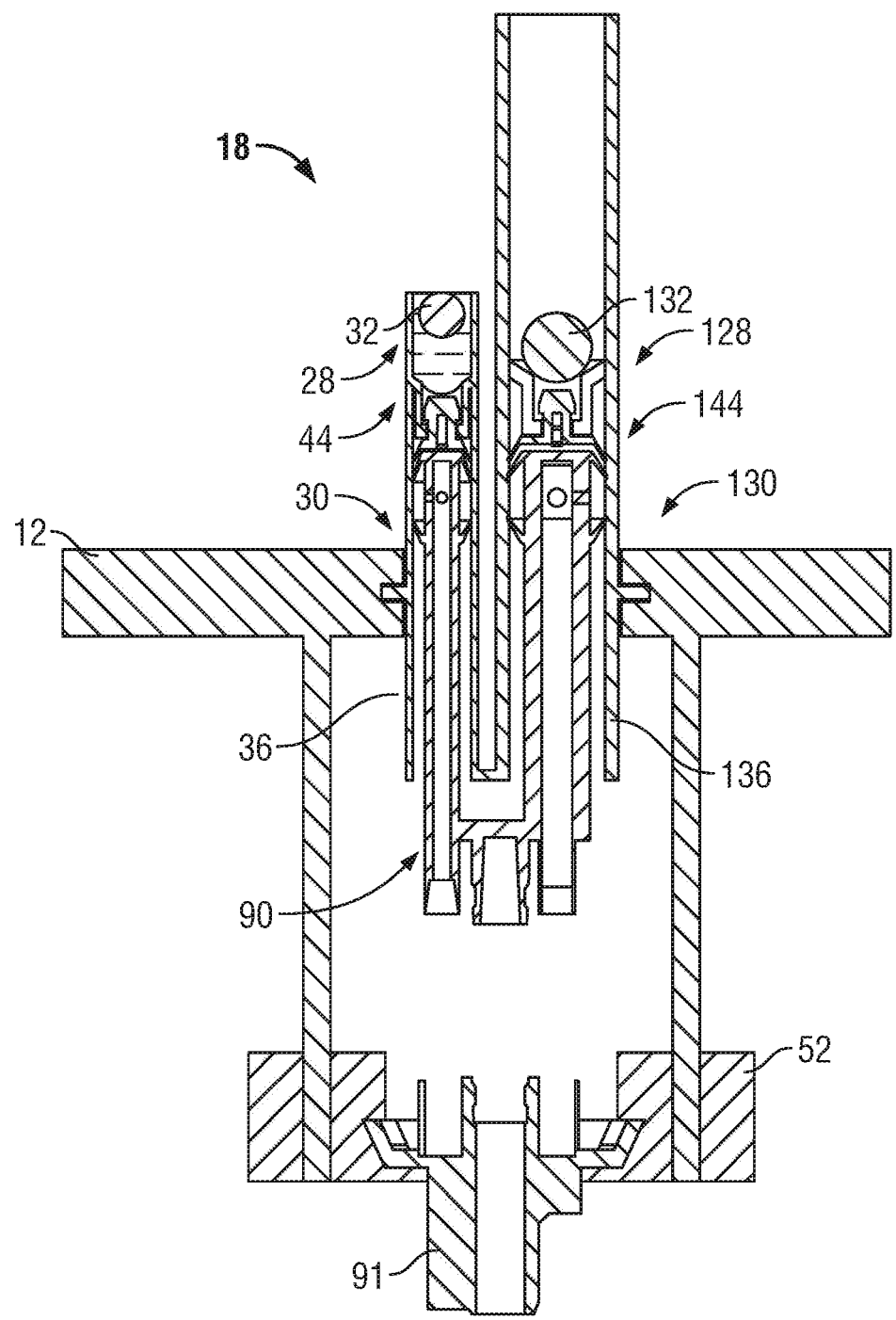
FIG. 10 is a schematic cross-sectional front view of the dispenser of FIG. 6 with a left reservoir filled with liquid and a right reservoir empty of liquid and the piston of a piston pump in an extended position with the driven member and the driving member of the piston coupled.

With the discharge of the first fluid 17 and the second fluid 117 from the respective reservoirs, conditions can arise from which as shown in FIG. 9, the first float 32 is in a closed position and the second float 132 is in an open position or, as shown in FIG. 10, the first float 32 is in an open condition and a second float 132 is in a closed condition. When either of the conditions of the floats are in a closed position with the releasable juncture arrangement 92 in a coupled position, that is, with the driven member 90 coupled to the driving member 91, then with continued reciprocal movement of the driving member 91, a vacuum will be caused to be created in the case that the first float valve 28 is closed axially inwardly from the first piston element 42 sufficiently strong to overcome the frictional engagement of the releasable juncture arrangement 92 as to apply axially directed forces to the driven member 90 to draw the driven member 90 away from the driving member 91 greater than the frictional forces holding the driving member 91 and the driven member 90 together. As a result, the driven member 90 will be drawn axially inwardly from the driving member 91 uncoupling the releasable juncture arrangement 92, thus axially separating the driven member 90 from the driving member 91 as shown in FIG. 9.

Similarly, in the case that the second float valve 128 is closed, with the driven member 90 and the driving member 91 coupled together with continued reciprocal movement of the driving member 91 a vacuum will be created in the second pump 130 which will draw the driven member 90 axially away from the driving member 91 sufficient to uncouple the driven member 90 and the driving member 91 placing the releasable juncture arrangement 92 in the uncoupled condition as shown in FIG. 10.

In the second embodiment of FIGS. 6 to 10, two reservoirs are provided with two pumps for discharge of fluid from two reservoirs. In the event that the liquid in either of the two reservoirs drops to a level below a threshold fluid level for the float valve for one of the two pumps, then a vacuum condition will be created which will sever the driven member 90 from the driving member 91 and thereby prevent continued discharge from both reservoirs since the movement of the driving member 91 will no longer move with the driven member 90.

The second embodiment of FIGS. 6 to 10 illustrates an arrangement for discharge of fluid from two reservoirs with two piston pumps. It is to be appreciated that similar arrangements may provide for discharge from three or more reservoirs with a separate piston pump for each reservoir and with each of the pumps connected to a driven member 90 which will become uncoupled from a driving member should a respective float valve leading to any one of the pumps assume a closed condition.

Use of the pump arrangement 18 of FIG. 6 in a manual dispenser is particularly advantageous to prevent the continued discharge when at least one reservoir is empty of liquid since it avoids the need for including other mechanisms for monitoring of the relative levels of fluid in one or more of the reservoirs.

Figure 11:
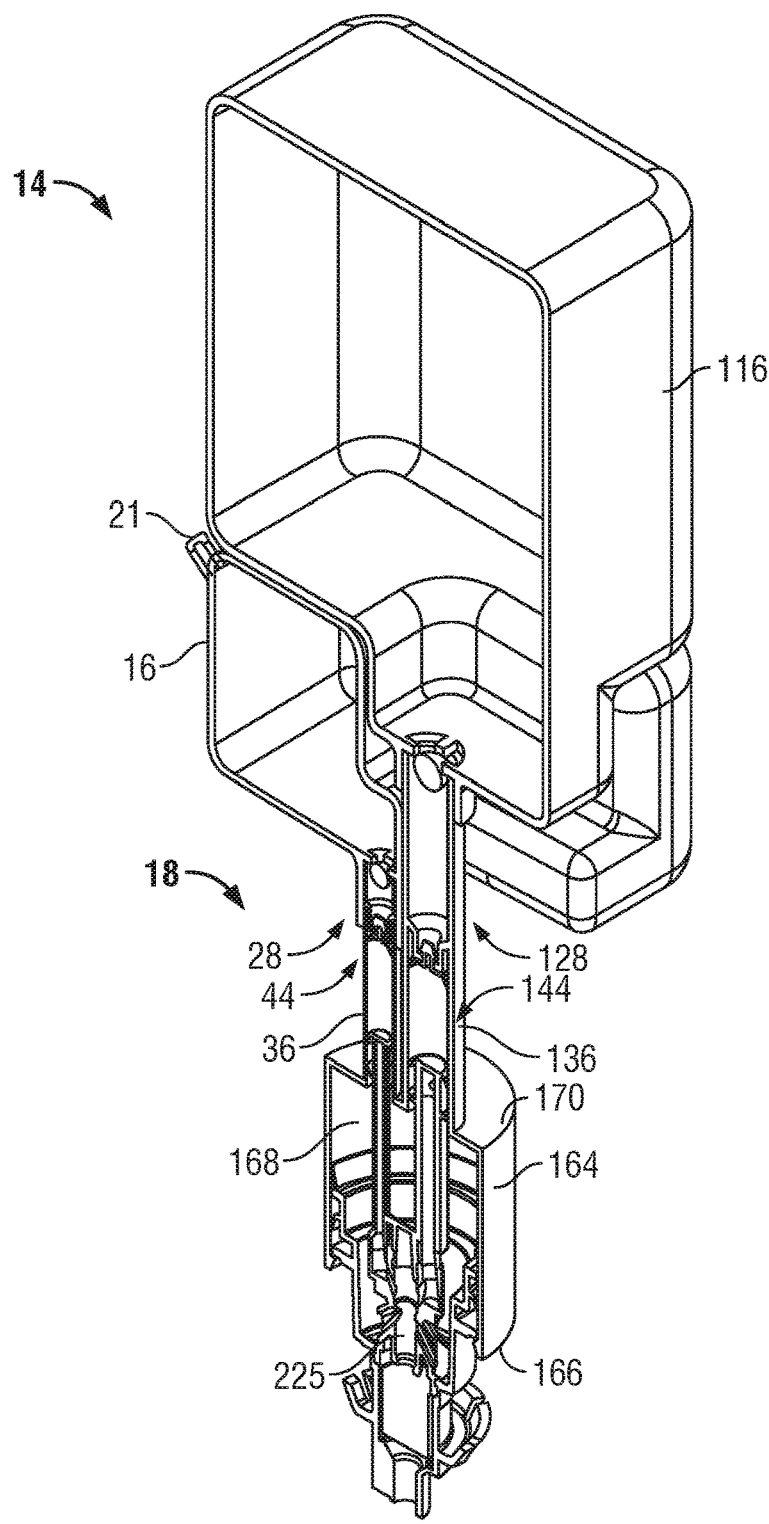
FIG. 11 is a cross-sectional schematic front perspective view of a cartridge in accordance with a third embodiment of the present invention with two reservoirs filled with liquids and a piston of a piston pump in an extended position with a driven member and a driving member of the piston coupled together.

Reference is made to FIGS. 11 to 14 showing a third embodiment of a cartridge 14 in accordance with the present invention. FIG. 11 is a cross-sectional pictorial view illustrating a cartridge 14 comprising a first reservoir 16 and a second reservoir 116 which two reservoirs 16, 116 are identical to those illustrated in FIGS. 6 and 7 in respect of the second embodiment.

In the third embodiment of FIGS. 11 to 14, a first chamber-forming member 36 and a second chamber-forming member 136 are identical to those shown in the second embodiment of FIGS. 6 to 9 but for the exception that the separating flange 70 extends radially outwardly about the center axis 139 to support an outer tubular member 164 which extends axially outwardly from the supporting flange 70 to an open end 166. An air chamber 168 is defined axially outwardly of the supporting flange 70 inwardly of the outer tubular member 164. As can be best seen in FIG. 13, the first chamber-forming member 36, the second chamber-forming member 136, the supporting flange 70 and the outer tubular member 164 together comprise a chamber-forming member 169 which is preferably integrally formed from plastic as a unitary component.

In the third embodiment of FIGS. 11 to 14, the first and second float valves 28, 128, the first and second floats 32, 132 and the first and second one-way valves 44, 144 are identical to those illustrated in the second embodiment of FIGS. 6 to 10. As well, in the third embodiment of FIGS. 11 to 14, the driven member 90 is identical to the driven member 90 illustrated in the second embodiment of FIGS. 6 to 10.

In the third embodiment of FIGS. 11 to 14, the driving member 91 has a number of features which are the same as in the second embodiment of FIGS. 6 to 10. As can be seen in the exploded view of FIG. 13, the driving member 91 is shown as formed for convenience of manufacture from two elements, namely, an intermediate stem portion 170 and an outer member 173. The outer member 172 provides an outer stem portion 173 from which an air disc 176 extends radially outwardly and axially inwardly to a resilient radially outer peripheral edge 178 which is adapted to engage an interior side wall 180 of the outer tubular member 164 to prevent flow at least axially outwardly therepast but preferably both axially inwardly and axially outwardly therepast. The air disc 176 is also shown to carry a secondary air seal disc 181 that also extends radially outwardly to a peripheral edge 182 which is directed axially outwardly and is also adapted to engage the side wall 180 of the outer tubular member 164 to assist in preventing flow axially inwardly therepast. Additionally, the air disc 176 includes a radially outwardly extending guide flange 183 adapted to be located in sliding engagement with the side wall 180 of the outer tubular member 164 to assist in coaxially locating the driving member 91 coaxially within the outer tubular member 164 and, as well, to engage a radially inwardly extending stop flange 184 on the outer tubular member 164 to limit axial outward movement of the driving member 91 relative to the outer tubular member 164.

The outer stem portion 173 carries a radially outwardly extending engagement member 72, the same as in the first and second embodiments as well as a discharge passage 148 leading to a discharge outlet 89, the same as in the second embodiment of FIG. 6. Inwardly from the discharge passage 148, the outer stem portion 173 provides a cylindrical foam generator chamber 185 within which there is received a circular outer foam generating screen 186 and a cylindrical spacing tube 187. At an axial inner end of the foam generator chamber 185, the outer stem portion 173 provides a radially outwardly extending annular channelway 188.

The intermediate stem portion 170 has an axial outer end 189 and an axially inner end 190. At the axially outer end 189, the intermediate stem portion 170 carries an annular tube 191 carrying a radially outwardly extending boss which is adapted to snap-fit into the annular channelway 188 in the outer stem portion 174 to secure the intermediate stem portion 170 to the outer stem portion 174 in a snap-fit against removal under normal forces occurring during operation of the pump arrangement 18.

At the inner end 190 of the intermediate stem portion 170, the intermediate stem portion 170 carries a first fluid socket 143 and a second fluid socket 145 as well as a coupling socket 93 identical to that illustrated in the second embodiment of FIGS. 6 to 11 so as to provide in the same manner as illustrated in FIGS. 6 to 11 a releasable juncture arrangement 92 between the socket 93 on the driving member 91 and the plug 48 on the driven member 90. The intermediate stem portion 170 has a central passageway 191 extending axially therethrough coaxially about the center axis 140 to receive the first fluid 17 from the first fluid socket 143 and the second fluid 17 from the second fluid socket 145 via the first outlet port 150 and the second outlet port 150.

Figure 12:
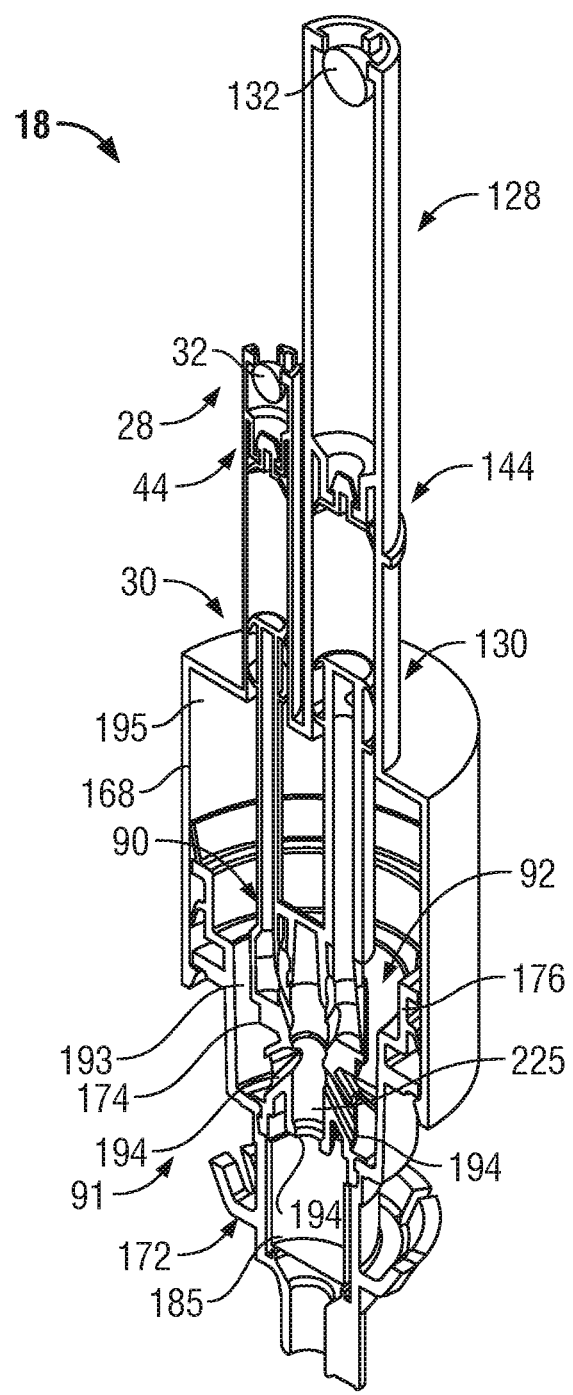
FIG. 12 is a cross-section perspective view of the pump arrangement of FIG. 11.
Figure 13:
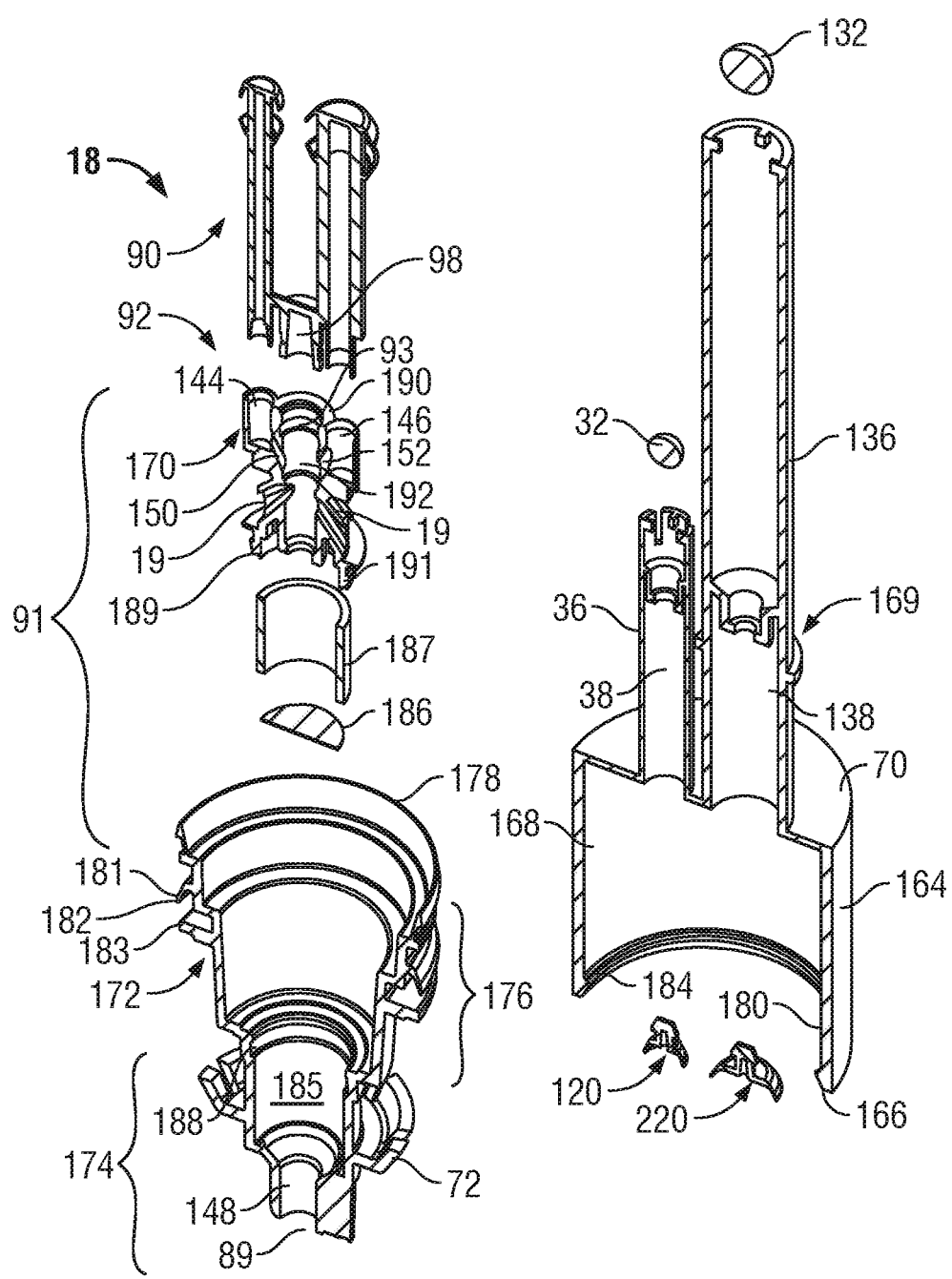
FIG. 13 is an exploded cross-section perspective view of the pump arrangement in FIG. 12.

As seen in FIG. 12, with the driven member 90 coupled to the driving member 91 in the extended position as shown in FIG. 12, the air disc 176 is received within the air chamber 168 of the outer tubular member 164 and an air compartment 192 is formed within the air chamber 168 whose volume varies with reciprocal movement of the driven member 90 and driving member 91 while the driven member 90 and the driving member 91 are coupled together. An annular liquid sump 193 is defined within the driving member 91 annularly about the intermediate stem portion 170 radially inwardly of axially extending portions of the air disc 176. Two air ports 193 are shown as extending through a wall of the intermediate stem portion 170 from the liquid sump 193 to the central passageway 191 within the intermediate stem portion 170. The liquid sump 193 forms a portion of the air compartment 192. The outer end of the central passageway 191 through the intermediate stem portion 170 opens at an outlet opening 194 open to the foam generator chamber 185.

With the driving member 91 coupled to the driven member 90, reciprocal movement of the driving member 91 in a retraction stroke from the extended position of FIG. 12 to a retracted position, decreases the volume in the air compartment 192 discharging any air and liquid within the air compartment 192 and its liquid sump 193 through the air ports 193 into the central passageway 191. Simultaneously, in the retraction stroke, the first pump 30 and the second pump 130 each discharge the first liquid 17 and the second liquid 117 from the first fluid socket 143 and the second fluid socket 145 into the central passageway 191. As a result in a retraction stroke, there is simultaneous discharge of the first fluid, the second fluid and air from the air compartment 191 to the foam generator chamber 185 and through the foam generator where they are mixed and form a mixture of the liquids and air discharged out the discharge outlet 898. In a withdrawal stroke, in moving from a retracted position to the extended position of FIG. 12, the volume of the air compartment 195 increases drawing atmospheric air in via the discharge outlet 89 through the foam generator into the central passage 192 and through the air ports 194 into the air compartment 195.

With the driving member 91 coupled to the driven member 90, reciprocal movement of the driven member 90 draws then discharges the first fluid 17 from the first reservoir 16 and the second fluid 117 from the second reservoir 116 out the discharge outlet as a foam admixed with air discharged from the air compartment 195.

The third embodiment effectively provides an air pump 196 comprising the air disc 176 within the air chamber 118.

As the first liquid and the second liquid are dispensed, conditions will come to arise in which the liquid in the first reservoir or the liquid in the second reservoir is discharged until the level of fluid in either reservoir drops to a level that one of the first float and the second float assume the closed position. On either the first float or the second float assuming the closed condition, continued movement of the driving member 91 with the driving member 91 and driven member 90 coupled will create a vacuum within one of the first pump 30 and the second pump 130 sufficient to draw the driven member 90 axially inwardly relative to the driving member 91 to separate the driven member 90 from the driving member 91 in the same manner that occurred as described with reference to the second embodiment of FIGS. 6 to 10.

Figure 14:
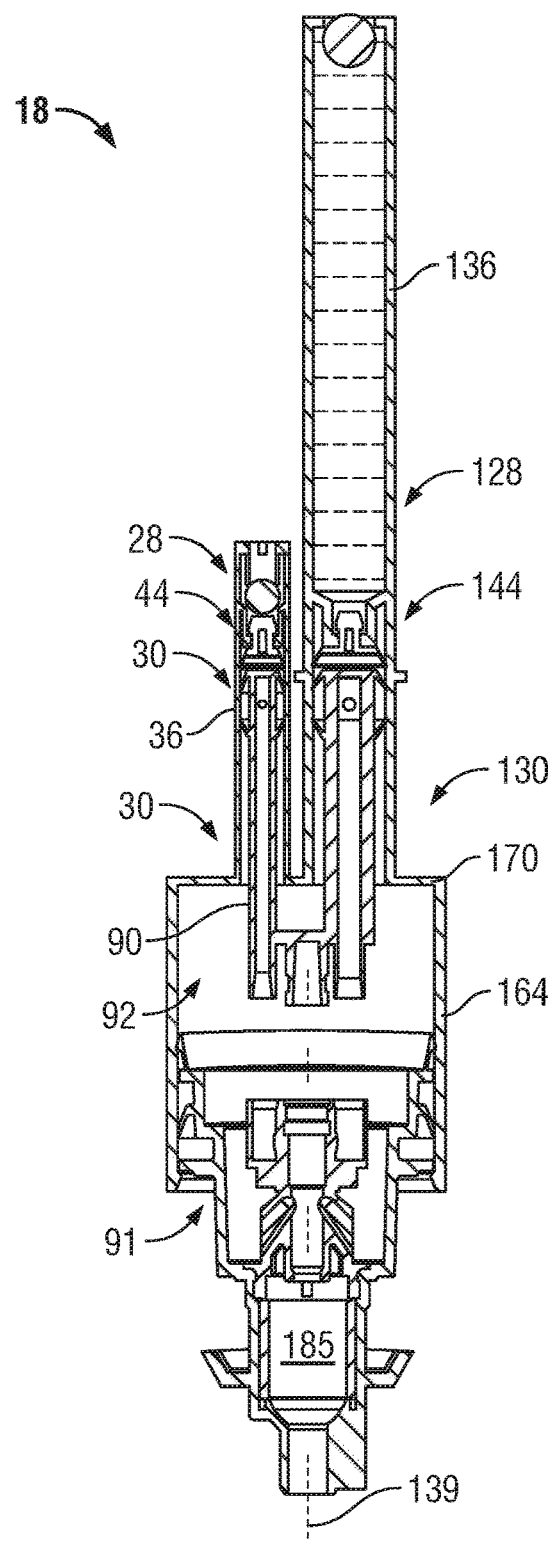
FIG. 14 is a cross-sectional front view of the pump arrangement of FIGS. 11 and 12 with a first float in a closed position, a second float in an open position and a piston with a driven member and a driving member uncoupled such that the driven member is separated from the driving member and with the driving member shown an extended position.

FIG. 14 illustrates a condition of the pump arrangement 18 of the third embodiment in which the first float 32 is in a closed condition and the driving member 91 has been drawn axially inwardly by vacuum created within the first dispensing chamber 38 so as to cause uncoupling of the releasable juncture arrangement 92 and separation of the driven member 90 from the driving member 91. The driving member 91 is shown in an uncoupled extended position in FIG. 14. With the third embodiment as with the second embodiment, should the second float 132 be in the closed condition, then with continued movement of the driving member 91 coupled to the driven member 90, vacuum would be created which would cause the separation of the driven member 90 from the driving member 91 as in the second embodiment.

Figure 15:
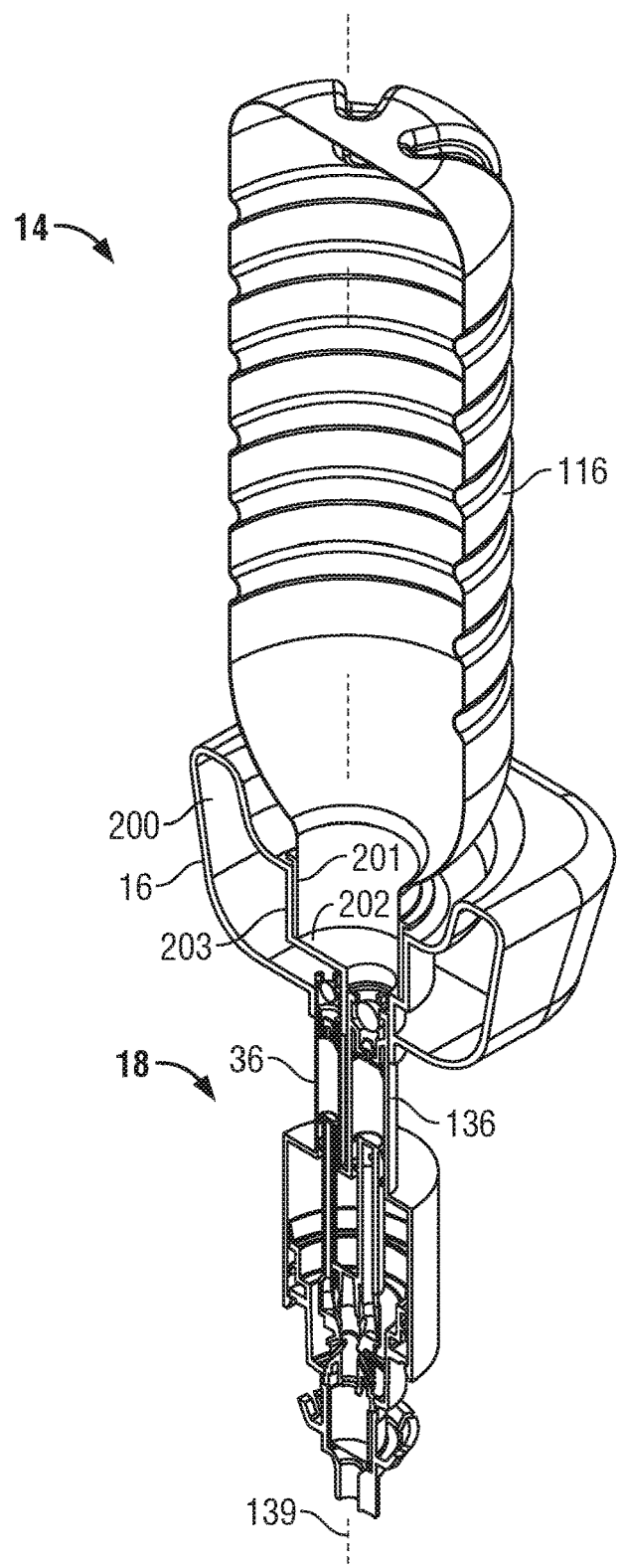
FIG. 15 is a schematic cross-sectional front perspective view illustrating a cartridge in accordance with a fourth embodiment of the present invention with different reservoir assemblies than in the third embodiment of FIG. 11.
Figure 19:
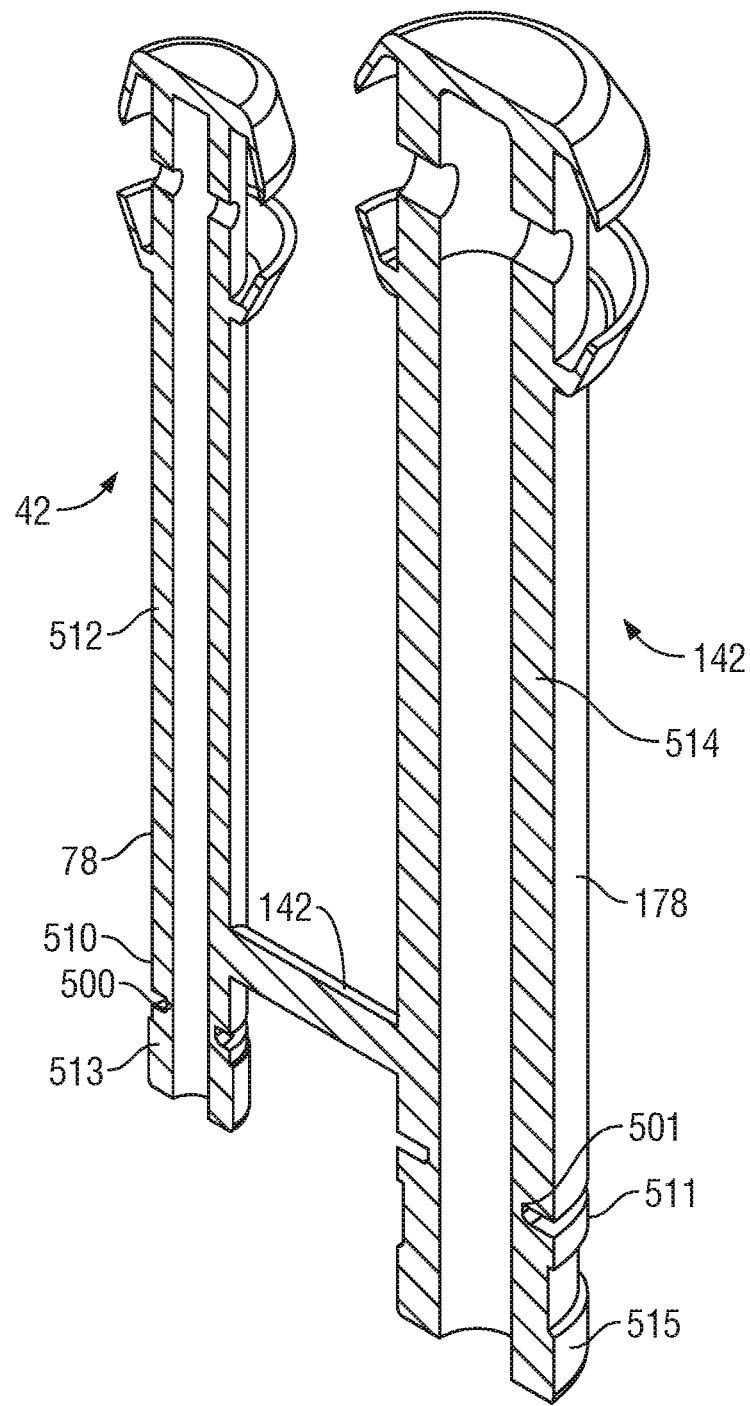
FIG. 19 is a vertical cross-sectional pictorial front view of the frangible piston element as seen in FIG. 17 with the frangible piston element as a unitary member.

Reference is made to FIG. 15 which illustrates a fourth embodiment of a cartridge 14 in accordance with the present invention. In FIG. 19, the pump arrangement 18 is identical to the pump arrangement illustrated in FIG. 14 with the exception that the axial extent of the second chamber-forming member 136 has been reduced. A first reservoir 16 is illustrated as providing a compartment 200 annularly about a center axis 139 albeit of a generally rectangular profile as seen in top view. The second reservoir 116 is illustrated as having a cylindrical neck 201 leading to its outlet 202 and with a socket 203 for the cylindrical neck 201 being formed within the first reservoir 16 coaxially about the central axis 139. The second reservoir 116 is shown as being symmetrical about the central axis 139 and preferably comprises a conventional bottle of a type used to contain water.

The second reservoir 116 preferably has its neck 201 sealably removably received within the socket 203 formed in the first reservoir 16. While not shown for the purposes of illustration, the connection between the neck 201 of the second reservoir 116 and the socket 243 of the first reservoir 16 may be a threaded connection with a suitable sealing arrangement provided.

In accordance with the fourth embodiment, the first reservoir 16 containing the first fluid 17 may be secured to the pump arrangement 18 and shipped as a unit with the first reservoir 16 containing a first liquid 17 to be dispensed such as, for example, concentrated liquid soap. Separately, the second reservoir 116 may be provided or procured, either shipped separately or representing a conventional water bottle readily commercially available to a user. Alternatively, the arrangement may be shipped with the second reservoir empty and, on site, the second reservoir may be filled with a liquid such as tap water and then secured to the first reservoir. Providing for the separate supply of the second reservoir with preferred liquids such as water having any known impurities, it is advantageous and the configuration of the second reservoir can facilitate easy shipment and handling in a minimal space and conventional packaging.

Figure 16:
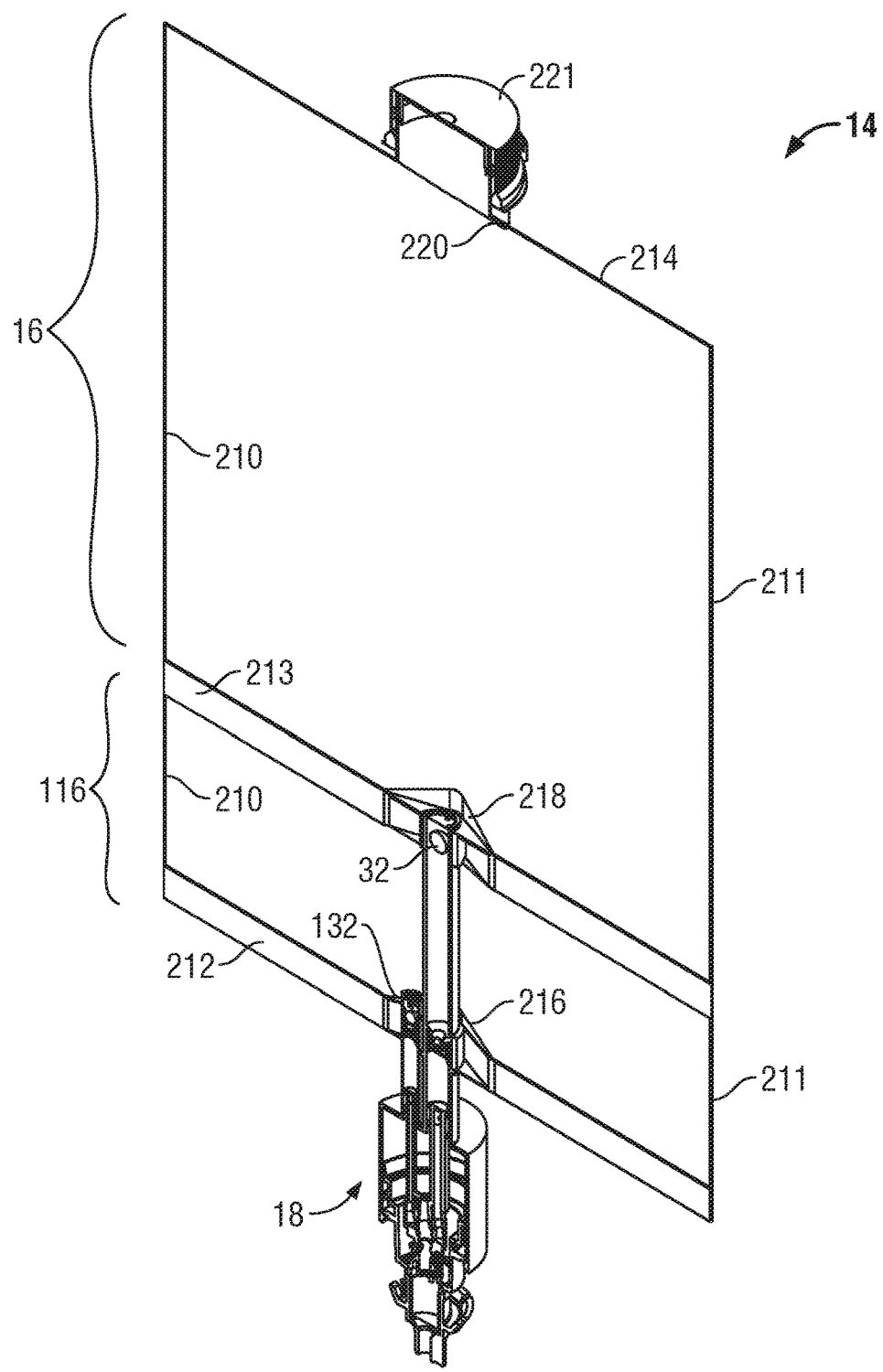
FIG. 16 is a schematic cross-sectional front perspective view of a replaceable cartridge in accordance with a fifth embodiment of the present invention.

Reference is made to FIG. 16 which illustrates a cross-sectional perspective view of a cartridge 14 in accordance with a fifth embodiment of the present invention.

In the fifth embodiment of FIG. 16, the pump arrangement 18 is identical to the pump arrangement 18 illustrated in FIG. 12. Each of the first reservoir 16 and the second reservoir 116 is formed as a collapsible bag. The first reservoir 16 and the second reservoir 116 are formed from two mirror image opposed thin sheets of plastic sheeting, only one sheet 209 being shown, which opposed sheets 209 are sealed together at lateral sides 210, 211 and along three lateral bands 212, 213 and 214. At a lower lateral band 212, a lower plug member 216 is sealingly engaged between the two sheets. The lower plug member 216 has two axially extending openings, one to sealably engage the first chamber-forming member 36 and the other to sealably engage the second chamber-forming member 136. An upper plug member 218 is secured within the upper lateral band 213. The upper plug 218 has a single opening to sealingly engage the second chamber-forming member 136. The inner end of the first chamber-forming member 36 opens into the first reservoir 16. The inner end of the second chamber-forming member 136 opens into the second reservoir 116. The upper lateral band 214 is sealed to a threaded neck plug 220 adapted to removably secure a threaded cap 221 and provide a double opening to the second reservoir 116.

The cartridge 14 as shown in FIG. 16 is preferably shipped with the first reservoir 16 filled with a first fluid but the second reservoir 116 unfilled. At a location where the cartridge 14 is to be used, the second reservoir 116 is filled with the second fluid such a water via the cap 221.

In the fifth embodiment illustrated in FIG. 16, the pump arrangement 18 is shown to include a first float 32 and a second float 132. However, insofar as the first reservoir is not vented but provides a collapsible reservoir, once the first fluid is pumped out of the first reservoir 16, further operation of the first pump 30 will result in a vacuum being created within the first reservoir 16 which vacuum is sufficient to uncouple the releasable juncture arrangement 92. In the embodiment of FIG. 16, the first float 32 is not necessary and the first float 32 and the first float valve 30 may be eliminated. Similarly, in FIG. 16 insofar as the second reservoir 116 may not be vented but is a closed collapsible reservoir, then the second float 132 and the second float valve is also unnecessary. In FIG. 16, the provision of the first reservoir to be collapsible and not vented without a float valve 28 and the second reservoir 116 which is also collapsible and not vented or may be vented may preferably be provided to include the second float valve 128 out of caution that the cap 221 may leak. It is to be appreciated that a collapsible container such as that illustrated for the first reservoir in FIG. 16 could be used in conjunction with a non-collapsible second reservoir 16 such as illustrated, for example, in FIG. 15.

Figure 17:
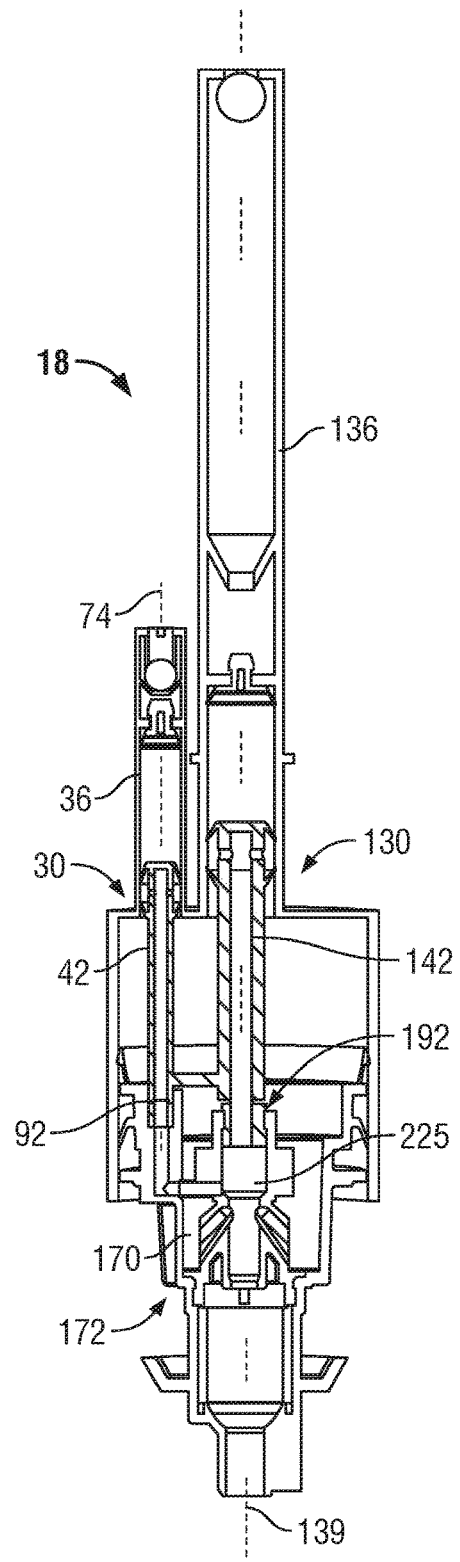
FIG. 17 is a cross-sectional front view of a pump arrangement in accordance with a sixth embodiment of the present invention for use with two reservoirs with a frangible piston element of a piston pump shown as a unitary member in an extended position with a driven member and a driving member of the piston coupled together with a left float in a closed position and a right float in an open position.

Reference is made to FIGS. 17 to 21 showing a pump arrangement in accordance with a sixth embodiment of the present invention. The pump arrangement of FIGS. 17 to 21 has very close similarities to the pump arrangement shown in FIGS. 11 to 14 and can be used in direct substitution thereof. The pump arrangement shown in FIG. 17 is identical to the pump arrangement as shown in FIG. 14 but for two notable differences. In FIG. 14, the driving member 91 and the driven member 90 are frictionally engaged with frictional forces preventing disengagement unless an applied tension force parallel the axes is greater than a threshold tension force. In the embodiment of FIG. 17, the driving member 91 and the driven member 90 are mechanically engaged through frangible members 500 and 501 that sever when the applied tension force parallel the first axis is greater than the threshold tension parallel the first axis. The use of frangible members to provide the releasable juncture arrangement 92 in the embodiment of FIGS. 17 to 21 is a first difference between FIG. 17 and FIG. 14.

A second difference is that in FIG. 17 the second chamber-forming member 136 and the second piston pump 130 including the second piston element 142 are coaxial about the center axis 139. The second fluid socket 145 is also coaxial about the center axis 139 and leads directly coaxially into the mixing chamber 225.

The first chamber-forming member 36, the first piston pump 30 and the first piston element 42 as well as the first fluid socket 143 are disposed about a first axis 74 parallel to the center axis 139. The first fluid socket 143 is formed as a portion of the outer member 172 so as to carry the first fluid socket 143 with a first portion 502 of a first fluid outlet port 149 extending axially outwardly then radially inwardly to sealably engage with a second portion 504 of the first fluid transfer port 150 that extends radially through the intermediate stem portion 170 into the mixing chamber 225.

Referring to FIG. 19, axially outwardly from the bridge member 142, the first stem 78 is provided with a radially inwardly extending channelway 510 which reduces a cross-sectional area of the stem 78 to form the annular frangible portion 500 which separates an axially inward portion 512 of the stem 78 from an axially outward portion 513 of the stem. Similarly, the second stem 178 is provided with a radially inwardly extending channelway 511 which reduces a cross-sectional area of the stem 178 to form the annular frangible portion 501 which separates an axially inward portion 514 of the stem 178 from an axially outward portion 515 of the stem 178. The annular frangible portions 500 and 501 are selected such that each of the axially inner stem portions 512 and 514 and axially outer stem portions 513 and 515 are mechanically engaged with one of the frangible members with the frangible members to sever when applied tension forces parallel the axis are greater than a threshold tension parallel the axis.

Figure 20:
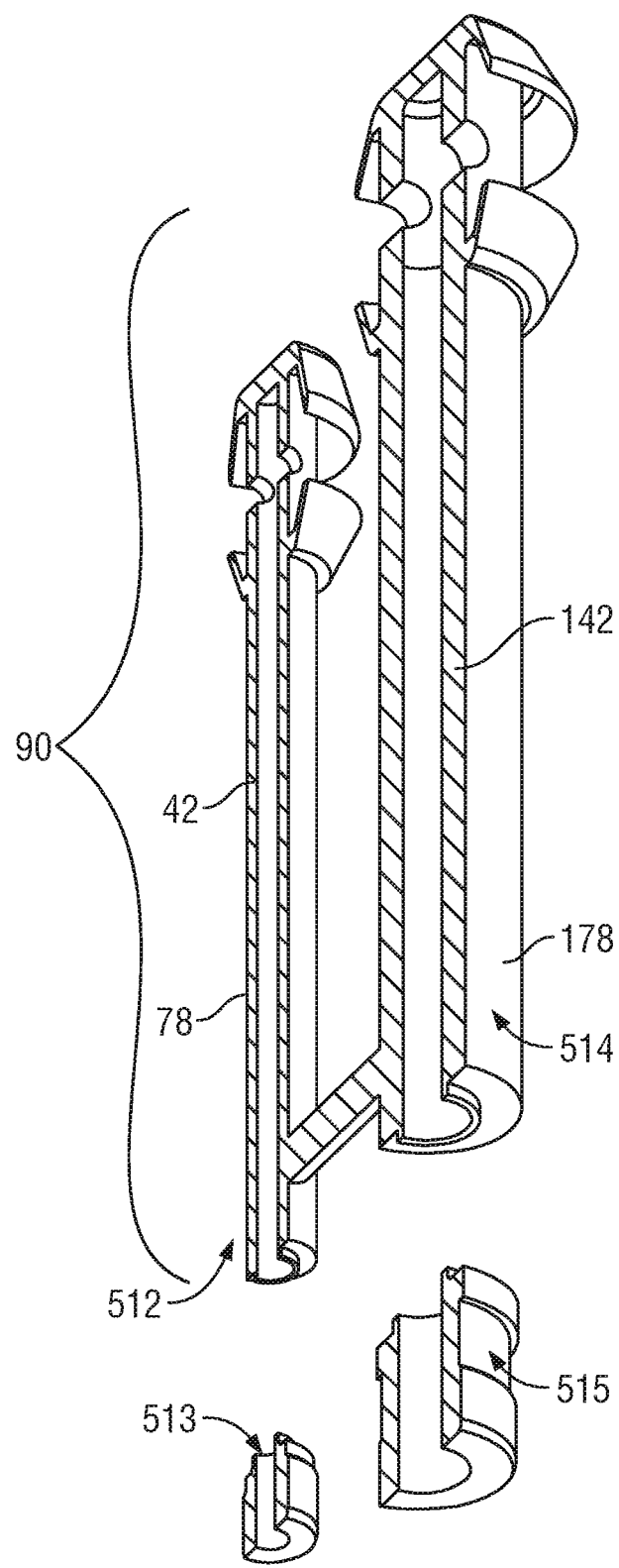
FIG. 20 is vertical cross-sectional pictorial front view of the frangible piston element as seen in FIG. 18 with the frangible piston element broken into axially spaced portions.
Figure 21:
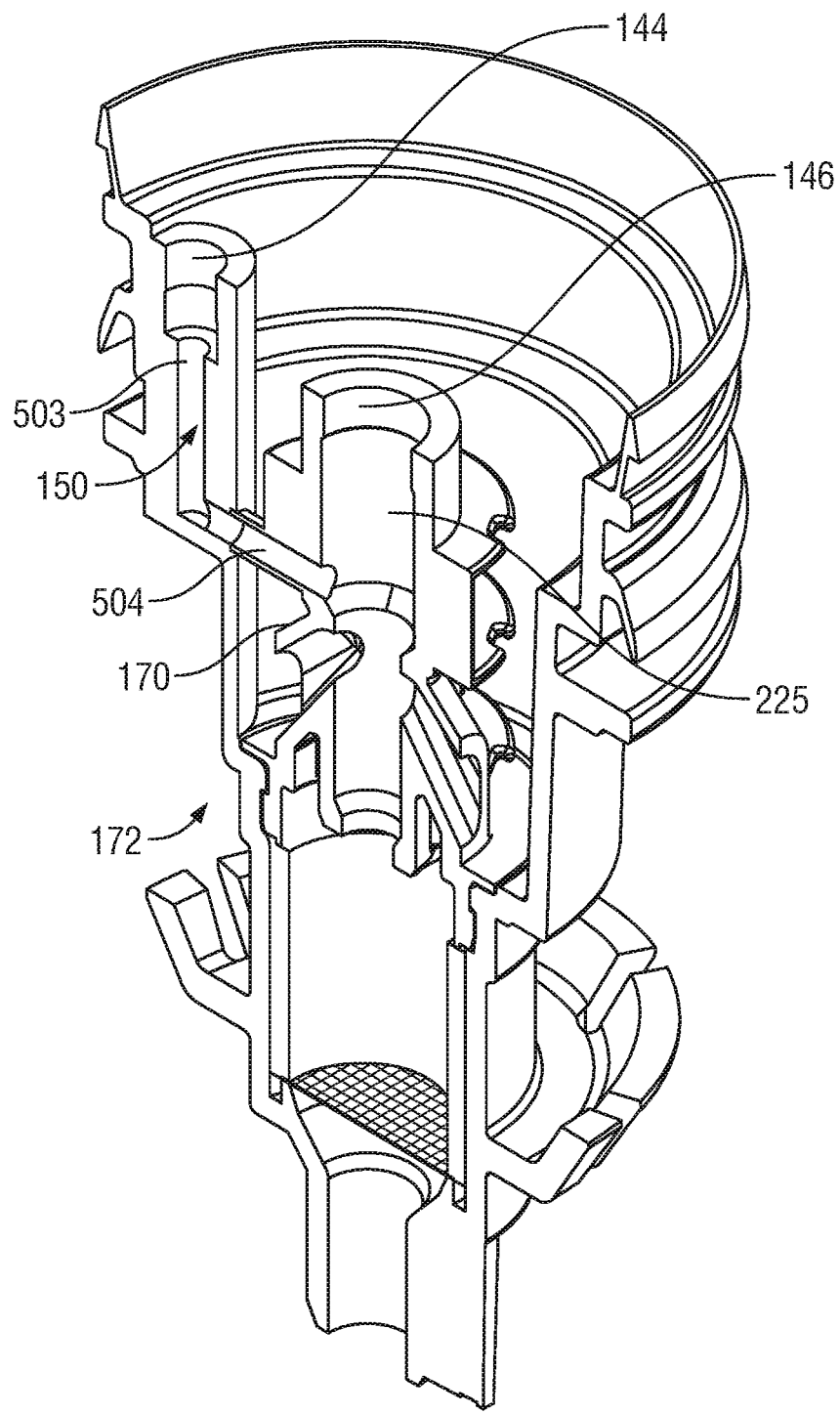
FIG. 21 is a vertical cross-sectional pictorial front view of the driving member of FIG. 17 other than the axially outer portions of the frangible piston element.

FIG. 20 schematically illustrates a condition of the first piston element 42 and the second piston element 142 together with the bridge member 141 after the two annular severable portions 500 and 501 have been severed showing the two axially outer severable portions 513 and 515 uncoupled from the axially inward portions 512 and 514 of their respective stems 78, 178.

In accordance with the embodiment of FIGS. 17 to 21, the driven member 90 comprises the bridge member 141 together with the first piston element 42 and the second piston element 142 axially inwardly from the annular severable portions 500 and 501 on the stems 78, 178.

Figure 18:
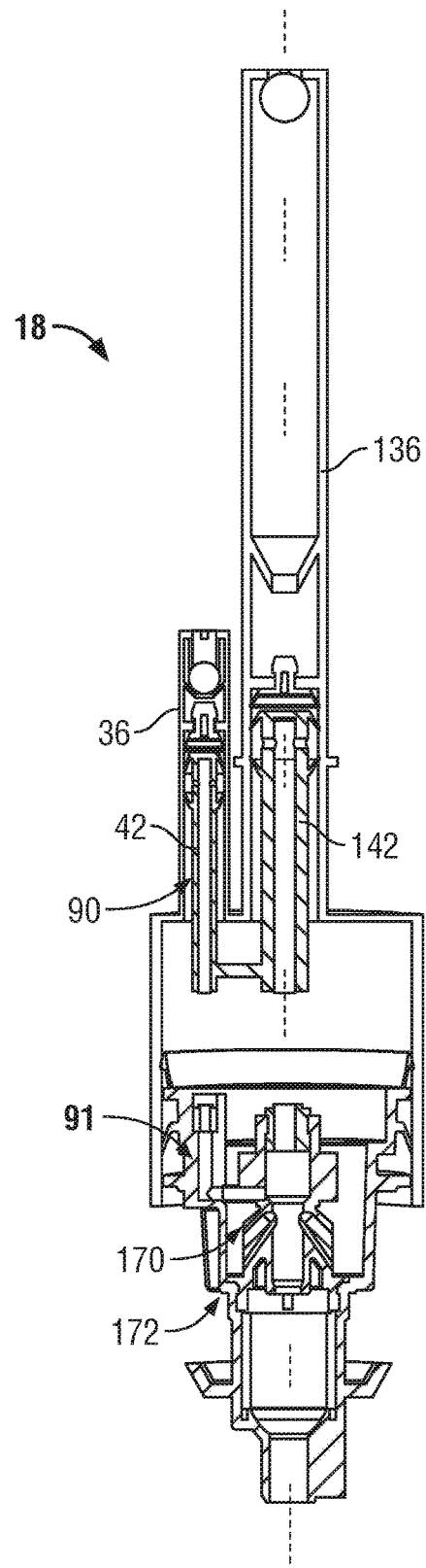
FIG. 18 is a cross-sectional front view of a pump arrangement in FIG. 17 but with the frangible piston element broken into axially spaced portions with an axially inner portion forming a driven member spaced axially inwardly from and uncoupled from a driving member carrying axially outer portions.

Referring to FIGS. 17 and 18, the axially outer ends of the outer portion 513 of the first stem 78 forms a plug that is coaxially received within the first fluid socket 143 in a friction fit engagement that prevents removal under axially directed forces experienced during normal operation of the pump arrangement. Similarly, the axially outer portion 515 of the second stem 178 carries a plug that is frictionally engaged within the second fluid socket 146 against removal under axially directed forces experienced during normal operation of the pump. FIG. 17 illustrates a coupled condition of the releasable juncture arrangement 92 with the annular severable portions 500 and 501 intact. From the position of FIG. 17 with the first float 32 in a closed position, continued movement of the outer member 172 by the actuator results in a vacuum being created which will apply axially directed forces to the driven member 90 sufficient to sever both the severable portions 500 and 501 to assume a condition as shown in FIG. 18 with the releasable juncture arrangement 92 uncoupled.

As can be seen in FIG. 18, the axially outer driving member 91 may be considered to be the combination of the intermediate stem portion 170, the outer member 172 and each of the axially outer portions 513 and 515 of the stems 78, 178 axially outwardly from the annular severable portions 500 and 501.

In the embodiment of FIGS. 17 to 21, the outer portions 513 and 515 of the stems 78, 178 are illustrated as being received in a friction fit against removal within the first fluid socket 143 and the second fluid socket 145. This coupling, however, may be by other means including gluing, adhesion or fusion.

In the embodiment of FIGS. 17 to 21, rather than having two severable portions 500 and 501, merely one severable portion might be provided, for example, on the second stem 178 and the axially outer end of the first stem 78 may be received within the first fluid socket 143 in either merely a sealing engagement or in a friction fit engagement. Thus, the releasable juncture arrangement 92 may be provided by a combination of use of frangible members, friction fit couplings and sealable sliding couplings.

A preferred use of the invention in accordance with the present invention is for the delivery of at least two fluids, a first liquid 17 from a first reservoir and a second liquid 117 from a second reservoir in which the first liquid is different than the second liquid. One preferred arrangement is with the dispenser 10 comprising a dispenser of hand cleaning fluids in which the first fluid is a concentrated liquid such as a concentrated liquid soap or a concentrated disinfectant and the second fluid is a diluent for the first fluid such as, for example, water for a liquid soap or a water and alcohol diluent for a liquid disinfectant. However, many other fluids may be used without departing from the scope of the present invention. The fluids may comprise cleaners, soaps, disinfectants, insecticides, beverages, oils and condiments. As to the particular nature of the fluid, the fluids need to be adequately flowable through each of the successive pumps without undue buildup of vacuum pressures inside the pumps other than conditions where uncoupling of the releasable juncture arrangement is desired. The fluids thus may be liquids or other flowable material including particulate matter, creams such as hand creams and suntan lotions, hair creams, shampoo and the like.

In accordance with the present invention, the cartridge 14 is preferably a removable and replaceable cartridge for use in a dispenser 10 such as a soap dispenser. This is not necessary, however. The pump arrangement 18 may be a permanent fixture within a dispenser 10 and the first and second reservoirs 16 suitably removable and replaceable. As well, each of the reservoirs 16 may be adapted for refilling.

A pump arrangement in accordance with the present invention may be used as a primary mechanism to prevent operation of a pump to dispense liquid after a reservoir containing the liquid is empty. The pump arrangement in accordance with the present invention may be utilized in conjunction with other systems and arrangements towards monitoring whether or not a reservoir may be empty of a fluid to be dispensed. For example, a dispenser may include in addition to the pump arrangement, various sensors and the like to determine if a reservoir is empty of fluid and to discontinue dispensing. The present invention, however, provides an advantageous mechanical arrangement for preventing the continued dispensing of fluid from one or more reservoirs when any one of the reservoirs is empty of fluid. The pump arrangement in accordance with the present invention does not require any electronic components and is adapted for use merely in a manually operated dispenser.

The first embodiment in FIG. 1 schematically illustrates the use of an electric motor 60 to move the actuator plate. Motorized movement of an actuator plate may adopt systems such as that disclosed in U.S. Pat. No. 8,071,933 to Ophardt et al, issued Dec. 6, 2011, the disclosure of which is incorporated herein by reference.

The preferred embodiments illustrate the coupling and uncoupling of the engagement flange 72 with the actuator plate 52. Various arrangements for such coupling and uncoupling may be provided as, for example, including those disclosed in U.S. Pat. No. 8,113,388 to Ophardt et al, issued Feb. 14, 2012, the disclosure of which is incorporated herein by reference.

In each of the preferred embodiments, each of the piston pumps has been illustrated as having a structure very similar to that disclosed in U.S. Pat. No. 5,975,360 to Ophardt, issued Nov. 2, 1999, the disclosure of which is incorporated herein by reference. In these pumps, a separate one-way valve has been provided. However, the provision of a separate one-way valve is not necessary and, as disclosed in above-noted U.S. Pat. No. 5,975,360, by the provision of an additional disc inward from the inner disc 90 to be received in a smaller diameter inner portion of the dispensing chamber 36, the separate one-way valve 44 may be eliminated. An arrangement such as disclosed in FIG. 13 of U.S. Pat. No. 5,975,360 could be utilized as a piston pump without the need for the one-way valve as a separate component.

In the third embodiment of the pump arrangement 18 as illustrated in FIG. 11, an arrangement is provided by which an air pump 196 simultaneously discharges air with the discharge of liquid from one or more liquid reservoirs so as to provide a foam comprising a mixture of one or more of the liquids and air. In the arrangement of FIG. 12, two liquids are discharged into a mixing chamber 225 which mixture of the two liquids is then mixed with air and passed through the foam generator chamber 185 to provide a foam of the mixed liquids and air. The outer stem portion 173 could be modified such that merely one of the liquids is mixed with air to form a foam and the other liquid is delivered to the discharge outlet 89 without passing through the foam generator chamber 185. An arrangement as shown in FIG. 12 could be modified to provide a single reservoir 16 with the liquid from the single reservoir mixed with air and discharged as a foam.

In the embodiment of FIG. 11, the open end of the first dispensing chamber 38 opens into the inner end of the air chamber 168 and the open end of the second dispensing chamber 138 opens into the inner end of the air chamber 168. A mixing chamber 225 is provided affixed to the driving member 91. The mixing chamber 225 receives the first fluid 17 from the first pump 30 and the second fluid 117 from the second pump 130 and air from the air pump mixing the first fluid, the second fluid and the air to produce an air and fluid mixture and directing the air and fluid mixture into the foam generator chamber 135 and hence out the dispensing outlet 89.

The pump arrangement of the first embodiment is illustrated in FIGS. 1 to 5 with the reservoir having a suitable vent opening 21 to vent the reservoir to the atmosphere and let the level of the fluid 17 drop to a level that each float 32 moves from an open condition to a closed condition. Each of the reservoirs 16, 116 in FIGS. 7 and 11 is unvented but are provided to include at least some air or other gas. Preferably, when initially filled with their respective liquid, some air is provided in the reservoirs such as up to 10%, preferably, 3 to 10% as is typical of many filling operations. The reservoirs in FIGS. 7 and 11 may be uncollapsible or collapsible. Preferably, the reservoirs in FIGS. 7 and 11 are collapsible and collapse as their liquid is drawn from the reservoirs. The threshold vacuum required to uncouple the releasable juncture arrangement 92 is selected to be greater than the vacuum required to draw liquid out from each reservoir.

In accordance with the embodiment of the present invention of FIG. 16, the pump arrangement 18 is shown for use with a reservoir which is not vented and does not contain any air or gas and permits a vacuum to be built up in the reservoir as the reservoir becomes emptied of the fluid and with vacuum is sufficient to uncouple the releasable juncture arrangement 92. With the collapsible bag for a reservoir as in FIG. 14, the fluid can easily be drawn from the reservoir until it is empty without the need to create any substantial vacuum to draw liquid from the bag. The vacuum required to draw liquid out from the reservoir of FIG. 16 needs to be less than the threshold vacuum required to uncouple the releasable juncture arrangement 92 at least until the reservoir is empty of liquid.

When, as in FIG. 16, a reservoir is an unvented collapsible reservoir without any gas in the reservoir, a float valve is unnecessary but may still be included. Avoiding the float valve has the advantage of avoiding the need to have the pump arrangement provide the float valve to be orientated so that the float 32 will float upward in the fluid 17 to the open condition and move down under gravity to sit on the float valve seat 34 under gravity in the closed condition.

The preferred embodiments illustrate the releasable juncture arrangement 92 as including a socket on the driving member 91 and a plug on the driven member 90. Of course, a socket could be provided on the driven member 90 and a plug on the driving member. Various other mechanical arrangements providing for a releasable frictional engagement of the driving member 91 and the driven member 90 may be utilized which are overcome by axially directed tension forces applied across the juncture.

In the preferred embodiments, the float valves 28, 128 as upstream from the one-way valves 44, 144, however, this is not necessary. The float valves 28, 128, may be provided intermediate the inner end of the piston elements 42, 142 and the respective one one-way valves 44, 144.

In the preferred embodiments the floats 32, 132 are shown as spherical. This is not necessary and the floats may have varying shapes and configurations with complementary cage structures.

While the invention has been described with reference to the preferred embodiments, many modifications and variations will now occur to persons skilled in the art. For a definition of the invention, reference is made to the following claims.

We claim:

1. A pump arrangement comprising:
a first piston pump having a first dispensing chamber and a first piston element reciprocally movable along a first axis in the first dispensing chamber to draw a first fluid into the first dispensing chamber from a first reservoir through a first conduit opening into the first dispensing chamber and discharge the first fluid out a first discharge outlet,
the first piston pump including a first inlet one-way valve across the first conduit, the first inlet one-way valve providing for flow of the first fluid from the first reservoir to the first dispensing chamber but preventing flow of the first fluid from the first dispensing chamber to the first reservoir,
wherein reciprocal movement of the first piston element discharges the first fluid from the first reservoir until the first reservoir is empty of the first fluid wherein further reciprocal movement of the first piston element creates a first vacuum condition in first dispensing chamber axially inward of the first piston element,
the first piston element including a driven member,
a driving member movable reciprocally parallel to the first axis,
a releasable juncture arrangement releasably coupling the driving member and the driven member together, the releasable juncture arrangement having a coupled condition and an uncoupled condition,
in the coupled condition, the releasable juncture arrangement couples the driving member and the driven member together such that reciprocal movement of the driving member parallel the first axis moves the first piston element parallel the first axis in unison,
in the uncoupled condition, the releasable juncture arrangement does not couple the driving member and the driven member together such that reciprocal movement of the driving member parallel the first axis does not move the first piston element rendering the first piston pump inoperative to discharge the first fluid by movement of the driving member,
with the releasable juncture arrangement in the coupled condition, when the first vacuum condition in the first dispensing chamber is greater than a threshold separation vacuum, the releasable juncture arrangement assumes the uncoupled condition.

2. The pump arrangement of claim 1 wherein the driving member is adapted to be removably coupled to an actuator member which moves the driving member reciprocally parallel to the first axis,
a first float valve across the first conduit between the first reservoir and the first dispensing chamber,
the first float valve including a first float movable between an open condition and a closed condition,
the first float buoyant in the first fluid, the first float assuming the open condition when the level of the first fluid in the first conduit is above a predetermined first fluid float level, the first float assuming the closed condition when the level of the first fluid in the first conduit is at or below the predetermined first fluid float level, with the first float in the open condition, the first float valve permitting for flow in the first conduit from the first reservoir to the first dispensing chamber, with the first float in the closed condition, the first float valve preventing flow in the first conduit from the first reservoir to the first dispensing chamber, with the first float in the closed condition, reciprocal movement of the first piston element creates the first vacuum condition in first dispensing chamber between the first float valve and the first piston element.

3. The pump arrangement of claim 2 wherein:
the first float valve is across the first conduit between the first reservoir and the first inlet one-way valve.

4. The pump arrangement of claim 1 wherein the first reservoir is unvented and collapsible.

5. The pump arrangement of claim 3 wherein the first reservoir is vented to the atmosphere.

6. A pump arrangement as claimed in claim 1 including:
a second piston pump having a second dispensing chamber and a second piston element reciprocally movable along a second axis in the second dispensing chamber to draw a second fluid into the second dispensing chamber from a second reservoir through a second conduit opening into the second dispensing chamber and discharge the second fluid out an outlet selected from the first discharge outlet and a second discharge outlet, the second axis parallel to the first axis, the second piston pump including a second inlet one-way valve across the second conduit, the second inlet one-way valve providing for flow of the second fluid from the second reservoir to the second dispensing chamber but preventing flow of the second fluid from the second dispensing chamber to the second reservoir, wherein reciprocal movement of the second piston element discharges the second fluid from the second reservoir until the second reservoir is empty of the second fluid wherein further reciprocal movement of the second piston element creates a second vacuum condition in second dispensing chamber axially inward of the second piston element, a coupling bridge member mechanically linking the first piston element and the second piston element together for movement in unison parallel the first axis and forming the driven member, in the uncoupled condition of the releasable juncture arrangement, the movement of the driving member does not move the driven member rendering both the first piston pump inoperative to discharge the first fluid by movement of the driving member and the second piston pump inoperative to discharge the second fluid by movement of the driving member, with the releasable juncture arrangement in the coupled condition, when either the first vacuum condition is greater than the threshold separation vacuum or the second vacuum condition is greater than the threshold separation vacuum, the releasable juncture arrangement assumes the uncoupled condition.

7. A pump arrangement as claimed in claim 2 including:
a second piston pump having a second dispensing chamber and a second piston element reciprocally movable along a second axis in the second dispensing chamber to draw a second fluid into the second dispensing chamber from a second reservoir through a second conduit opening into the second dispensing chamber and discharge the second fluid out an outlet selected from the first discharge outlet and a second outlet, the second axis parallel to the first axis, the second piston pump including a second inlet one-way valve across the second conduit, the second inlet one-way valve providing for flow of the second fluid from the second reservoir to the second dispensing chamber but preventing flow of the second fluid from the second dispensing chamber to the second reservoir, wherein reciprocal movement of the second piston element discharges the second fluid from the second reservoir until the second reservoir is empty of the second fluid wherein further reciprocal movement of the second piston element creates a second vacuum condition in second dispensing chamber axially inward of the second piston element, a coupling bridge member mechanically linking the first piston element and the second piston element together for movement in unison parallel the first axis and forming the driven member, in the uncoupled condition of the releasable juncture arrangement, the movement of the driving member does not move the driven member rendering both the first piston pump inoperative to discharge the first fluid by movement of the driving member and the second piston pump inoperative to discharge the second fluid by movement of the driving member, with the releasable juncture arrangement in the coupled condition, when either the first vacuum condition is greater than the threshold separation vacuum or the second vacuum condition is greater than the threshold separation vacuum, the releasable juncture arrangement assumes the uncoupled condition.

8. The pump arrangement of claim 7 including:
a second float valve across the second conduit between the second reservoir and the second dispensing chamber, the second float valve including a second float movable between an open condition and a closed condition, the second float buoyant in the second fluid, the second float assuming the open condition when a level of the second fluid in the second conduit is above a predetermined second fluid float level, the second float assuming the closed condition when the level of the second fluid in the second conduit is at or below the predetermined second fluid float level, with the second float in the open condition, the second float valve permitting for flow in the second conduit from the second reservoir to the second dispensing chamber, with the second float in the closed condition, the second float valve preventing flow in the second conduit from the second reservoir to the second dispensing chamber, with the second float valve in the closed condition, reciprocal movement of the second piston element creates the second vacuum condition in second dispensing chamber between the second float valve and the second piston element.

9. The pump arrangement of claim 8 wherein:
the first float valve is across the first conduit between the first reservoir and the first inlet one-way valve, the second float valve is across the second conduit between the second reservoir and the second inlet one-way valve.

10. The pump arrangement of claim 8 wherein the second reservoir is unvented and collapsible.

11. The pump arrangement of claim 8 wherein the first reservoir is vented to the atmosphere and the second reservoir is vented to the atmosphere.

12. The pump arrangement as claimed in claim 1 wherein the driving member and the driven member are mechanically engaged through a frangible member that severs when an applied tension force parallel the first axis is greater than a threshold tension force parallel the first axis.

13. The pump arrangement as claimed in claim 1 wherein the driving member and the driven member are frictionally engaged with frictional forces preventing disengagement unless an applied tension force parallel the first axis is greater than a threshold tension force parallel the first axis.

14. The pump arrangement as claimed in claim 1 wherein the releasable juncture arrangement is formed by the driving member and the driven member being engaged to prevent relative axial movement of the driving member relative the driven member by the application across the releasable juncture arrangement of an applied tension force parallel the first axis unless the applied tension force parallel the first axis is greater than a threshold tension force parallel the first axis.

15. The pump arrangement as claimed in claim 2 wherein:
the first float valve including a first valve seat about a first fluid outlet opening, in the closed condition, a surface of the first float sealably engages the first valve seat to prevent flow through the first fluid outlet opening to the first dispensing chamber, and the first float valve including a first cage structure constraining movement of the first float within the first cage structure, the first float movable in the first cage structure between the open condition and the closed condition.

16. The pump arrangement as claimed in claim 8 wherein:
the first float valve including a first valve seat about a first fluid outlet opening, in the closed condition, a surface of the first float sealably engages the first valve seat to prevent flow through the first fluid outlet opening to the first dispensing chamber, and the first float valve including a first cage structure constraining movement of the first float within the first cage structure, the first float movable in the first cage structure between the open condition and the closed condition,
the second float valve including a second valve seat about a second fluid outlet opening, in the closed condition, a surface of the second float sealably engages the second valve seat to prevent flow through the second fluid outlet opening to the second dispensing chamber, and the second float valve including a second cage structure constraining movement of the second float within the second cage structure, the second float movable in the second cage structure between the open condition and the closed condition.

17. The pump arrangement of claim 1 wherein the first dispensing chamber having an open outer end,
the first piston element having a distal inner end coaxially slidable within the first dispensing chamber about the first axis,
the first piston element extending from the distal inner end outwardly through the open outer end of the first dispensing chamber to an outer end of the first piston element carrying the first discharge outlet,
a central passageway through the first piston element from the driven member to the driving member open to the first discharge outlet carried on the driving member.

18. The pump arrangement of claim 8 wherein:
the first dispensing chamber having an open outer end,
the first piston element having a distal inner end coaxially slidable within the first dispensing chamber about the first axis,
the first piston element extending from the distal inner end outwardly through the open outer end of the first dispensing chamber to an outer end of the first piston element carrying the first discharge outlet,
a central passageway through the first piston element from the driven member to the driving member open to the first discharge outlet carried on the driving member,
the second dispensing chamber having an open outer end,
the second piston element having a distal inner end coaxially slidable within the second dispensing chamber about the second axis,
the second piston element extending from the distal inner end outwardly through the open outer end of the second dispensing chamber to an outer end of the second piston element carrying the second discharge outlet,
a central passageway through the second piston element from the driven member to the driving member open to the second discharge outlet carried on the driving member.

19. A pump arrangement as claimed in claim 6 including a mixing chamber receiving the first fluid from the first discharge outlet and the second fluid from the second discharge outlet, mixing the first fluid and the second fluid to produce a composite fluid and directing the composite fluid from a composite outlet.

20. A pump arrangement as claimed in claim 8 including a mixing chamber receiving the first fluid from the first discharge outlet and the second fluid from the second discharge outlet, mixing the first fluid and the second fluid to produce a composite fluid and directing the composite fluid from a composite outlet.

* * * * *